United States Patent [19]
Leff

[11] Patent Number: 6,080,067
[45] Date of Patent: Jun. 27, 2000

[54] REFLECTIVE CURVED CONTAINER FOR VIEWING OBJECTS

[76] Inventor: Herbert L. Leff, 17-B Lakeview Ter., Burlington, Vt. 05401

[21] Appl. No.: 09/363,579

[22] Filed: Jul. 29, 1999

Related U.S. Application Data

[60] Provisional application No. 60/094,719, Jul. 30, 1998.

[51] Int. Cl.[7] ............................... A63G 31/00; A63J 5/00
[52] U.S. Cl. .................. 472/63; 472/61; 472/72; 359/617
[58] Field of Search ................... 472/59, 63, 57, 472/71, 61, 72; 359/616, 617; 40/900, 219

[56] References Cited

U.S. PATENT DOCUMENTS

| | | | |
|---|---|---|---|
| 3,151,206 | 9/1964 | Daymon | 359/617 |
| 3,164,923 | 1/1965 | Knott | 359/617 |
| 3,166,973 | 1/1965 | Healey | 40/900 |
| 4,040,716 | 8/1977 | Matsubara | 359/617 |
| 5,132,844 | 7/1992 | Sharp, Jr. | 359/617 |
| 5,229,884 | 7/1993 | Kelderhouse et al. | 359/616 |

*Primary Examiner*—Kien T. Nguyen
*Attorney, Agent, or Firm*—Donald W. Meeker

[57] ABSTRACT

A curved container structure has an interior curved reflective surface for reflecting varied and distorted images of objects placed therein or within the near focal range of the reflective surface. A rigid curved structure is metalized on the interior or on the exterior of a transparent structure. A reflective flexible disc has a radial slit with the two sides of the slit overlapping and held together by a temporary binder to form an adjustable cone. A protective cover over the reflective surface is transparent when used on the interior of the container. Objects on a holder are inserted into the curved structure through a main viewing opening or an opposite apex opening. A collar on the holder secures a cord for moving objects hanging therefrom. A rod within a tube may adjustably secure a cord therebetween. One or more cords, such as elasticized cords, may be stretched across or dangled into the viewing opening. A cover, with an attached cord for dangling the object, may be placed over the viewing opening. A watertight curved structure may contain liquid with objects floating therein. The device may be held by hand or on a support. A greeting card or similar structure contains a flexible curved viewing container attached therein, so that opening the card opens the curved viewing container. The reflective curved viewing container suspended by a cord with an object suspended from a cord inside the viewing container forms a mobile or a crib toy.

20 Claims, 10 Drawing Sheets

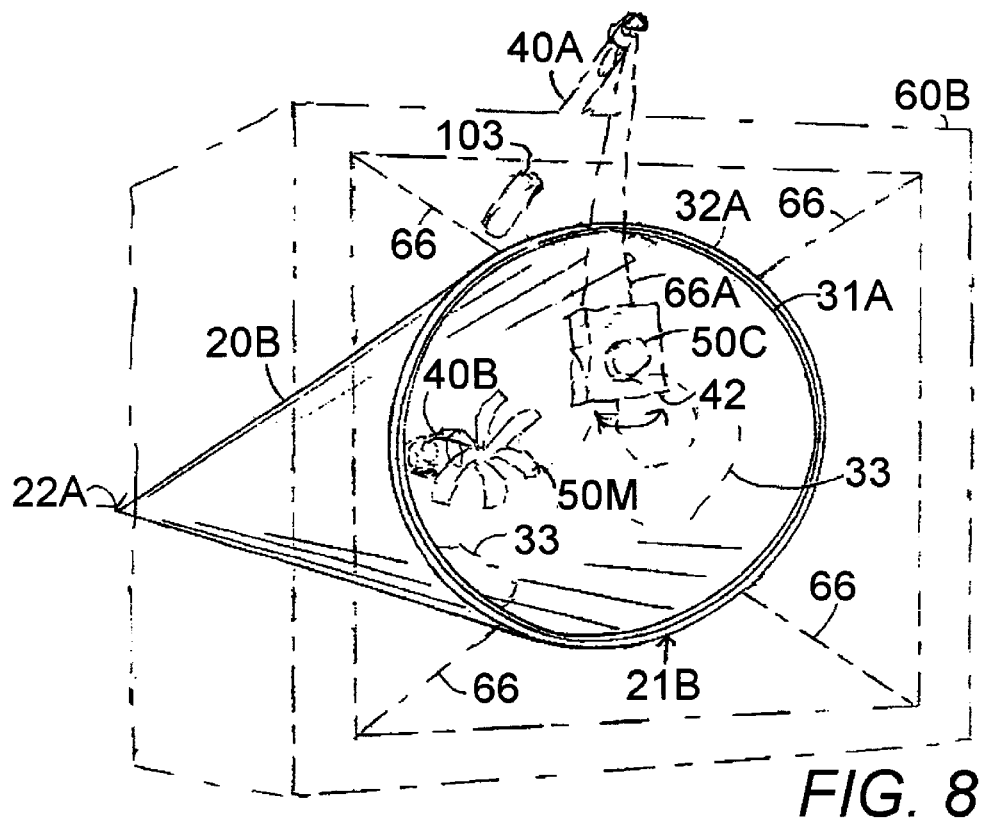
FIG. 8
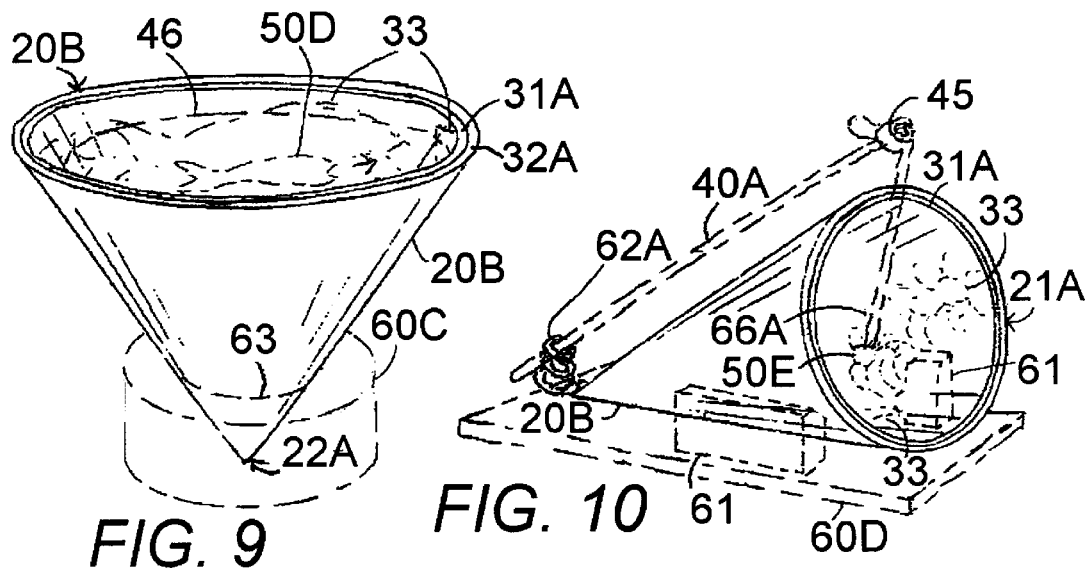
FIG. 9
FIG. 10

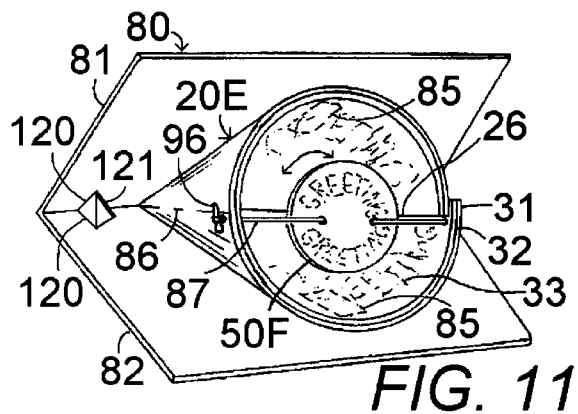
FIG. 11
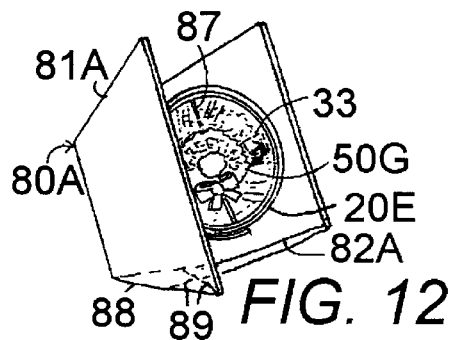
FIG. 12
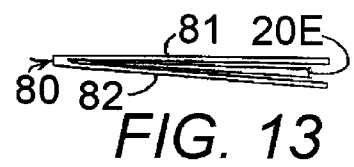
FIG. 13
FIG. 11A
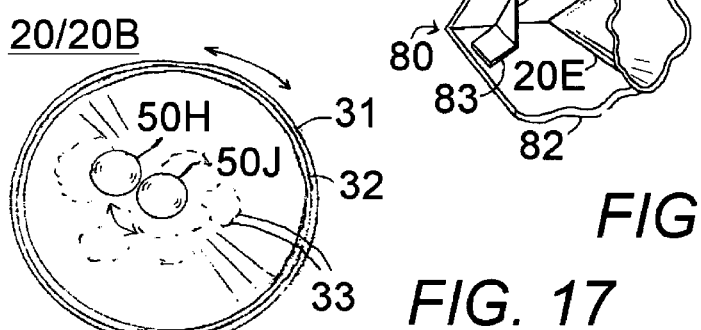
FIG. 14  FIG. 17
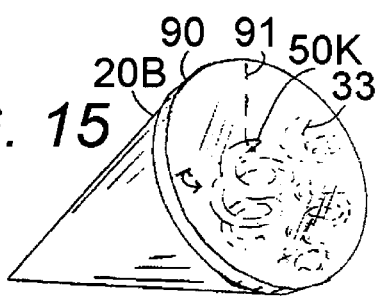
FIG. 15
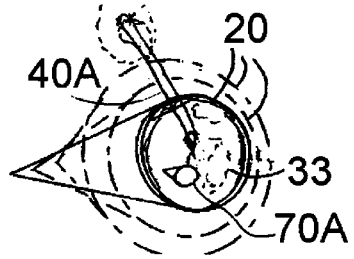
FIG. 18
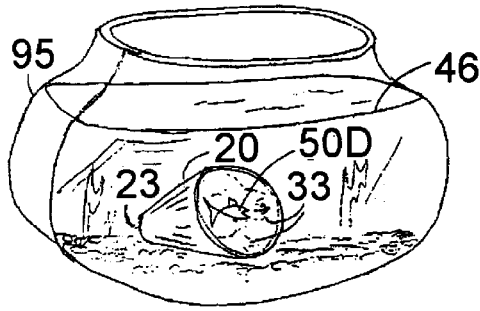
FIG. 16
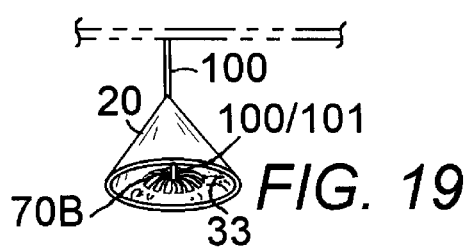
FIG. 19

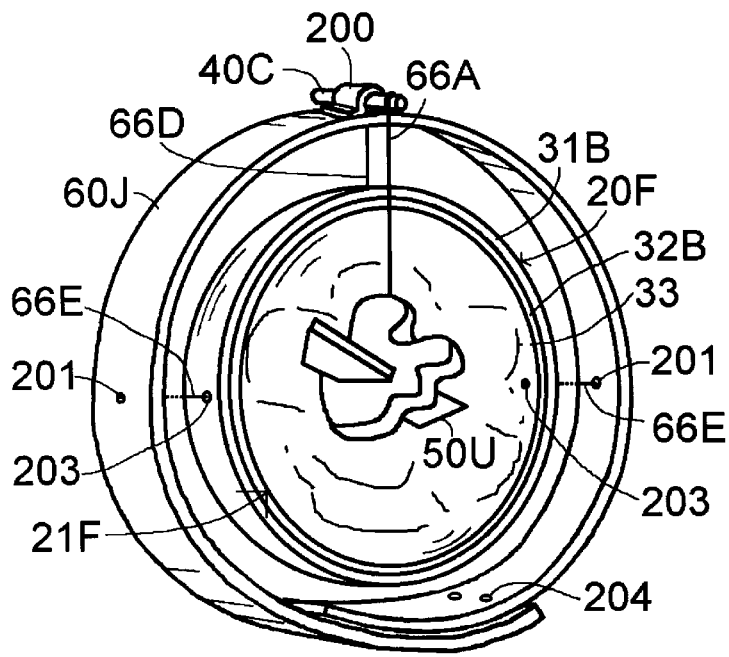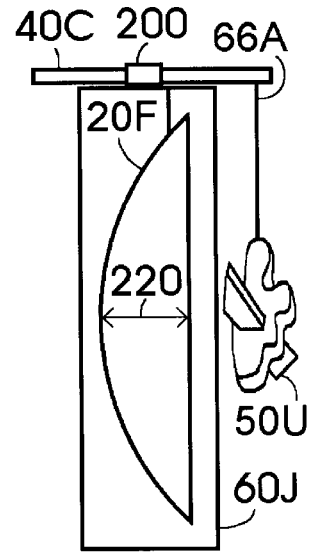
FIG. 37
FIG. 38
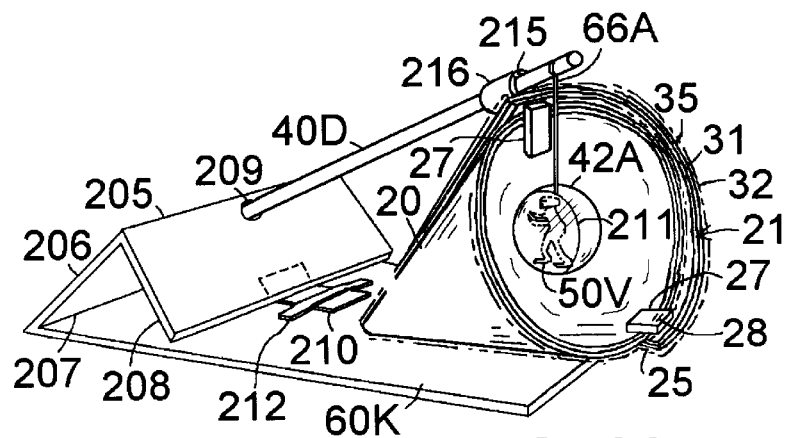
FIG. 39

6,080,067

REFLECTIVE CURVED CONTAINER FOR VIEWING OBJECTS

CLAIM OF PROVISIONAL APPLICATION RIGHTS

This application claims the benefit of United States Provisional Patent Application Ser. No. 60/094,719, filed on Jul. 30, 1998 now abandoned.

BACKGROUND OF THE INVENTION

1. Technical Field

The present invention relates to visual effects devices and in particular to a curved reflective viewing container having an interior curved reflective surface therein, a means for suspending any of a variety of objects within the near focal field of the curved reflective surface and for causing any of a variety of types of relative motion between the object or objects and the interior curved reflective surface, and at least one opening for simultaneously viewing the object or objects and the reflected image of the object or objects in the interior curved reflective surface, so that relative motion between the object or objects and the interior curved reflective surface produces distorted visual images of the object or objects in the interior curved reflective surface of the viewing container visible to an observer through the opening.

2. Description of the Prior Art

Many people are fascinated by interesting visual images produced by visual effects devices and can spend hours engaged in observing these effects and manipulating the devices to produce the effects. Kaleidoscopes are a primary example of visual effects devices which are very popular as toys for children and coffee table or office items for adults. Normally the observer looks into the viewer of a kaleidoscope and turns it while holding it up to a bright light for viewing multicolored and multi-shaped effects of either internal objects movable within a viewing enclosure or external objects seen through any of a variety of distorting lens configurations.

Advertising and sales displays take advantage of special visual effects devices to catch people's attention and make them aware of the product and its advantages. Interesting and unusual visual effects draw people in to explore the effect. Motion and color are both highly effective in visual displays to draw people's attention. Visual distortion of objects is also a highly effective attention getting device.

A number of prior art devices produce visual effects in a variety of ways. U.S. Pat. No. 4,838,541 issued to Stone shows an amusement device formed by winding a thin strip of reflective material into an elongated coiled configuration to create a tubular spiral with internal overlapping elliptical reflective layers formed by the coiling of the strip of reflective material. The Stone device is taped together to retain its shape and placed over a patterned target for viewing the multiple images of the pattern in the reflective coils of the spiral, producing a kaleidoscopic effect. The number of images produced by the Stone device corresponds to the number of overlapping layers along the length of the coiled configuration. The object rests on a horizontal surface and is stationary relative to the amusement device and cannot be suspended and moved in various positions within the Stone device. Therefore, in the Stone device, the visual effect is primarily a kaleidoscopic effect based on different reflections produced on each exposed layer of the device inside the tube formed. The Stone device does not provide a means for suspending any desired object within a near focal field of a curved reflective surface to permit the object to be reflected in the curved reflective surface and the reflections and object viewed simultaneously while enabling movement of the object relative to the curved reflective surface in a variety of different types of movement to permit different visual effects.

U.S. Pat. No. 3,164,923 issued to Knott provides a ball, rattle, rolling toy, tree ornament or other spherical object having internal visible reflective surfaces formed into angled flat surfaces or spherical dish-shaped or curved surfaces for reflecting various colored or patterned surfaces in relative motion with the reflective surfaces for varying visual effects. The Knott devices do not provide a means for suspending any desired object within a near focal field of a curved reflective surface to permit the object to be reflected in the curved reflective surface and the reflections and object viewed simultaneously while enabling movement of the object relative to the curved reflective surface in a variety of different types of movement to permit different visual effects.

U.S. Pat. No. 3,151,206 issued to Daymon reveals a collapsible truncated conical reflector used in solar heating applications or reflective lighting applications which is formed from a portion of an arcuate shaped reflective surface with foldlines for ridges therein connected together at the ends by tabs and slots. The Daymon device does not provide a means for suspending any desired object within a near focal field of a curved reflective surface to permit the object to be reflected in the curved reflective surface and the reflections and object viewed simultaneously while enabling movement of the object relative to the curved reflective surface in a variety of different types of movement to permit different visual effects.

U.S. Pat. No. 5,222,000 issued to Adler discloses a flexible mirror with a flexible foam frame which may be bent or twisted into various configurations for viewing a user's distorted reflections. The Adler device is not a container and is not intended for viewing objects and does not provide a means for suspending any desired object within a near focal field of a curved reflective surface to permit the object to be reflected in the curved reflective surface and the reflections and object viewed simultaneously while enabling movement of the object relative to the curved reflective surface in a variety of different types of movement to permit different visual effects.

U.S. Pat. No. 1,835,876 issued to Jenkins claims a drum shaped container having faceted planar reflective surfaces around the interior and a rotatable circular bottom platform for placing objects thereon to be viewed kaleidoscopically in the faceted reflective sides of the drum. The Jenkins device does not provide a curved reflective surface and does not provide a means for suspending any desired object within a near focal field of a curved reflective surface to permit the object to be reflected in the curved reflective surface and the reflections and object viewed simultaneously while enabling movement of the object relative to the curved reflective surface in a variety of different types of movement to permit different visual effects.

U.S. Pat. No. 4,871,055 issued to Poythress et al. indicates an amusement device for collecting coins having a clear funnel for receiving the coins mounted over a reflective hemispherical dish with a central hole into which the bottom end of the funnel is inserted. As coins spiral down the funnel the image in the reflective dish appears to be coins floating in space. The Poythress device does not provide a means for suspending any desired object within a near focal field of a curved reflective surface to permit the object to be reflected in the curved reflective surface and the reflections and object viewed simultaneously while enabling movement of the object relative to the curved reflective surface in a variety of different types of movement to permit different visual effects.

U.S. Pat. No. 4,040,716 issued to Matsubara describes a kaleidoscopic viewing device having an outer tube with an end reflective conical or pyramidal surface for viewing combined reflections of lined patterns on a movable tube within the outer tube. It provides a solid pyramidal or conical reflective surface at the end of a tube for viewing a single constructed image in the reflective surface based on lines imprinted in the tube. The Matsubara device does not provide a means for suspending any desired object within a near focal field of a curved reflective surface to permit the object to be reflected in the curved reflective surface and the reflections and object viewed simultaneously while enabling movement of the object relative to the curved reflective surface in a variety of different types of movement to permit different visual effects.

U.S. Pat. No. 5,229,884 issued to Kelderhouse et al. illustrates a kaleidoscope formed of a triangular reflective tube having an end container for objects which may be rotated to view the kaleidoscopic effects in the reflective tube. It has a three-panel reflective surface formed into a triangular tube, not a curved reflective surface. The Kelderhouse device does not provide a means for suspending any desired object within a near focal field of a curved reflective surface to permit the object to be reflected in the curved reflective surface and the reflections and object viewed simultaneously while enabling movement of the object relative to the curved reflective surface in a variety of different types of movement to permit different visual effects.

Some prior art devices use single or double reflective hemispheres with a single stationary object as scientific displays, and one prior art device utilized a ball permanently attached to a string for viewing in a reflective hemisphere. None of the prior art devices seem to make a provision for eliminating the rim ring reflections produced around the reflective surface adjacent to the opening, which rim ring reflections can detract from the aesthetic value of the reflections of an object being viewed and none made provisions for suspending any desired object interchangeably and movably and repositionably in any part of the near focal field of the reflective hemisphere.

None of the prior art devices provides a viewing container having a curved interior reflective viewing surface with a near focal field within which objects may be suspended for simultaneously viewing reflections of the objects and the objects themselves and a means for suspending any desired object within the near focal field and for creating any number of desired types of relative motion between the object and the reflective viewing surface, and a large opening in the container for viewing both the object and the reflection. Additionally, none has a conical reflective viewing container which has a flexible reflective interior surface and is adjustable in size and collapsible into a flat configuration with a means for placing any desired object within the near focal field of the reflective conical viewing container and creating any desired type of relative motion, or the appearance of relative motion, between the objects and the viewing container. None of the prior art provides a curved reflective viewing container which flattens and opens inside a greeting-card type hinged folder having a means for suspending and moving objects within the near viewing field of the curved reflective viewing container. The unexpected, unusual, changeable, interesting reflections produced by relative motion between a smooth curved reflective surface and objects suspended within the near focal field of the interior curved reflective surface would be most desirable in visual effects applications to view both the objects and the reflections simultaneously.

DISCLOSURE OF THE INVENTION

A primary object of the present invention is to provide a viewing container having a relatively large viewing opening to enable viewing with both eyes simultaneously and having an interior curved reflective surface having a near focal field within which any desired objects may be suspended and moved in any location and in any orientation and with any desired type of relative motion between the objects and the interior curved reflective surface to provide unusual visual effects. The objects and unusual, distorted reflections of the objects in the interior curved reflective surface are viewed simultaneously through the viewing opening.

Another object of the present invention is to enable the formation of an adjustable reflective conical viewing container which is easily assembled into a stable cone of any desired circumference from a flat flexible disc-shaped sheet of reflective material having an outer circular edge, a radial slit from the center out to the circular edge, and a binding means, such as a high friction binding tab, attached to the circular edge adjacent to one or both radial slits. Overlapping adjacent sides of the radial slit to any desired extent and inserting the outer circular edge of one side under the binding tab of the other side forms a stable flexible reflective conical viewing container into which and adjacent to which objects may be placed for viewing, thereby providing an inexpensive, adjustable, and easily assembled visual effects device.

A secondary object of the present invention is to provide an adjustable easily assembled reflective conical viewing container which is usable in a variety of environments and applications including toys, visual effects devices, art works, art and craft kits, games, fish bowls, bathtubs, greeting cards, advertising or sales displays, and any other application where unusual visual effects are desired. The device is formed from a disc-shaped sheet of flexible metalized polyester film, such as metalized MYLAR®, or other similar material which may be used with any desired object inserted therein.

An additional object of the present invention is to provide an adjustable, flexible, reflective, conical viewing container that yields (depending on the placement of the object, the tightness or angle of the cone, and the part of its interior surface viewed) enlarged (or near the apex, diminished and pulsating), sometimes multiple, curved, distorted, expanding, and contracting reflections of objects placed within the focal field of the cone's interior reflective surface, which reflections shift radically with movements of the viewer, the objects, the cone, or distortions in the cone's flexible sides, resulting in potentially amusing or aesthetically interesting experiences for the viewer. Distorting the sides of the cone creates different curves with points of inflection in between, creating interesting distortions in the reflected images.

A related object of the present invention is to provide a visual effects device with a high degree of interactivity with the viewer, since the reflections are affected by the viewer's own movements as well as by manipulation of the viewed objects, adjustment of the cone's tightness (angularity), movement of the cone, and pressure on the flexible sides of the formed cone.

A further object of the present invention is to provide an optional central point opening in the circular disc (which forms an apex opening in the cone) in the form of a hole through the material or short radial slits formed in the material from the center of the circular disc to enable the formation of tight (small angled) cones without binding and to create an access means for the insertion of objects or object holders through the apex opening.

Another object of the present invention is to provide a variety of suspending means for suspending any of a variety of objects within the near focal field of the reflective viewing container and creating any desired type of relative motion between the objects and the reflective viewing container. A rod inserted in the apex opening or positioned adjacent to or inserted in the larger circular edge viewing opening can suspend spinning objects attached directly to the rod, or the rod can dangle objects, spinning or bouncing or twirling or swinging or swishing them from a string or elastic cord or other suspending means attached to the rod. A wire may be attached to the outside of the conical viewing container and a cord-like element for suspending objects attached to the bent end of the wire through a notch in the viewing opening. A clear plastic container attached over the viewing opening may suspend and contain objects for viewing. A cylinder with a cord-like element may suspend objects and support the viewing container. The cylinder may alternately be affixed to the viewing container with a watertight seal and partially filled with liquid to suspend objects therein above or within the viewing container. If the device is flexible, the flexible surface of the reflective conical viewing container may be distorted to produce moving reflections of the object suspended within its near viewing field. The container may be filled with liquid or immersed in liquid to enable movement of objects (or fish) suspended by floating in the water. Any of a variety of objects may be inserted through the large viewing opening and the object or objects suspended by hand in the viewing field and manipulated, or the object or objects placed within the viewing container and the viewing container moved or the sides of the viewing container manipulated to change the image. One example is to place two small balls inside the viewing container and swirl the container around so that a first ball rests in the apex and a second ball is supported on and rotates around the first.

A further object is to utilize an additional support material forming a support surface of a similar diameter circular disc-shaped material formed into a conical shape to support the reflective disc while still allowing some flexing of the conical surface, thereby providing greater structural integrity. The support surface may act as a structural support of stiffer material used over a thin reflective conical surface, or act as a gripping surface, such as foam-like material, and will also act as an outside scratch resistant surface to protect the metalized reflective layer. The support material may be bonded or attached to the reflective disc material.

Another object is to provide a kit for creating and displaying art and craft works by attaching a flexible conical viewing container to a box of crayons, colored pencils, markers or the like with a suspended clip on an elastic cord-like element for suspending art and craft works created on paper or the like and moving the art and craft works within the near focal field of the flexible conical viewing container to create unusual reflected images therein. An adjustable flexible conical viewing container may be stored flat as a disc of reflective material attached by one edge to the box and then formed into an adjustable cone shape. A foldable flexible conical viewing container attached within a folder may be attached to the box with the bottom cover of the folder affixed to the box so that the folder opens up to open the conical viewing container.

A related object of the present invention is to provide a curved reflective viewing container in conjunction with a holder for suspending with motion any of a number of objects interchangeably in any position within the near focal field in combination with a variety of holding means and objects in a kit packaged together to explore reflections.

Yet another object of the present invention is to provide a bowl-shaped reflective viewing container (which may be a hemisphere) having an associated means for suspending and moving objects in the near focal field of the bowl-shaped reflective viewing container. Moving the object toward the center of the bowl-shaped reflective viewing container produces real reflections which emanate from in front of the reflective surface rather than behind it, a surprising three-dimensional popped out expanding reflected image of the object. The realistic nature of the 3-D image causes confusion about which is the real object and which is the image being viewed simultaneously through the viewing opening.

Still another object of the present invention is to provide a segment of a spherical reflector having an interior curved reflective surface, which segment has a depth from the face of the viewing opening to the deepest point of the curved reflective interior surface that is less than one fifth of the diameter of the sphere to eliminate any reflected rings adjacent to the perimeter of the curved reflective surface and produce only the reflected image of the object.

A corollary object of the present invention is to provide a hemispheric reflector or segment of a spherical reflector larger in depth than one fifth of the diameter of the sphere, wherein an annular rim protrudes across the viewing opening to cover from view the reflected rings which normally form adjacent to the perimeter, thereby leaving a clear image of the reflected object through the rim.

In brief, a reflective curved viewing container device has an interior curved reflective surface, a viewing opening formed in the interior curved reflective surface for receiving any of a variety of objects and for simultaneously viewing the object or objects and the reflections of the object or objects in the interior curved reflective surface. A near focal field comprises an area within the curved structure and outside the curved structure adjacent to the viewing opening. The curved structure is capable of receiving any of a variety of objects suspended within the near focal field so that the interior curved reflective surface is capable of emitting reflections of the object or objects visible simultaneously with the object or objects to a viewer through the viewing opening.

A rod, rod and cord, rod and tube and cord, wire and cord, transparent container, cylinder and cord, water-filled container, or other suspending means suspends any desired object within the near focal field and serves as a means for causing any desired type of relative motion between the object or objects and the interior curved reflective surface of the viewing container. Creating actual relative motion by moving the viewing container or moving the object or objects in any desired type of motion, or creating apparent relative motion by the user moving or distorting the wall of the viewing container produces distorted, changing, enlarged or diminished, three-dimensional, realistically illusory, and sometimes multiple reflected images of the object on the interior curved reflective surface observable by the viewer through the viewing opening along with the object which is also visible therethrough.

In the preferred embodiment, the present invention provides a circular sheet of flexible reflective material forming a flat disc reflective on at least one side and having an outer circular edge and a single slit from the center of the disc out to the circular edge to form two sides of the slit which may be overlapped to any desired extent to form an adjustable conical shape of any desired opening angle. A means for removably securing the overlapping sides of the slit together may comprise one or two binding clips, an adhesive means, a squeeze tab, a pair of mating hook and loop fasteners, a preferred single or pair of high-friction binding tabs affixed flat to the reflective material adjacent to the circular edge on one side of the slit with one end of the tab attached near the circular edge (by a staple, tape, glue, or other means) and the other edge of the tab extending inward toward the center of the disc in contact with the reflective material of the disc to form a binding fastener, or any other binding means. The circular disc is formed into an adjustable reflective conical container of any desired diameter by simply overlapping the sides of the slit to any desired extent and binding the overlapping sides together as by inserting the outer circular edge of one side under the binding tab on the other side to form a secure conical container having an interior reflective surface and an open end formed by the outer circular edge for viewing any desired objects and the reflections of the objects suspended within the reflective conical container or within a near focal field comprising an area within the conical structure and outside the conical structure adjacent to the viewing opening.

A central opening may be formed in the circular disc to prevent binding upon forming a small diameter conical reflective container and also to provide an apex opening at the apex of the conical reflective container for insertion and manipulation of objects to be viewed inside the conical reflective container or in the near focal field. Alternately, multiple radiating short slits can be cut or stamped out from the center of the disc to form a central flapped opening that serves the same function as the central opening while providing an apex reflective surface with no visible hole and a permeable area through which a rod or other object supporting means can pass.

Any of a variety of objects are suspended within the reflective conical viewing container or within the near focal field through the apex opening or the larger opening formed by the circular edge of the disc. Either the objects or the reflective conical viewing container is moved in any desired type of motion or the reflective flexible surface is altered in shape, as by squeezing the cone, or the viewer changes position so that the relative motion between the object and the reflective conical viewing container, or the apparent relative motion between the object and the reflective conical viewing container, creates often unpredictable three-dimensional enlarged or diminished, elongated, sometimes multiple, distorted and changing reflections of the object viewed on the inside surface of the reflective conical container through the large opening formed by the outer circular edge of the disc while simultaneously viewing the object itself. The reflections shift radically with movements of the viewer, the object or objects, the reflective conical container, or distortions in the flexible sides of the conical container, resulting in potentially amusing or aesthetically interesting experiences for the viewer.

In one embodiment, the curved structure is formed of a flexible material which is collapsible into a flat configuration and the device further comprises a foldable structure having two elements connected together by a hinge means. Each of the two elements has a flat interior face capable of folding flat together, such as in a greeting card, a stand-up advertising display, attached to art and craft tool boxes as a part of a kit, or other applications. The curved structure is attached to the flat interior face of each of the two elements, so that closing the two elements by folding the two elements together sandwiches the curved structure flat between the two elements and opening the two elements by pivoting the two elements apart opens the curved structure adjustably to any desired opening size and the opening and closing causes relative motion and apparent relative motion between the at least one object and the interior curved reflective surface of the curved structure. The means for suspending the at least one object comprises an elastic cord element or other suspending means attached across the viewing opening of the curved reflective structure, the elastic cord element having the at least one object attached thereto so that the at least one object may be turned to wind up the elastic cord element prior to closing the two elements so that opening the two elements produces a spinning of the at least one object.

An angled cut at a point along the folded portion of the two elements creates a triangular tab portion which may be pushed inside to maintain the two elements in an open position, enabling viewing of the moving object in the conical viewing container. Alternately, a triangular bottom corner portion of each of the two elements may be displaced adjacent to the hinge means to form a triangular base when the foldable structure is opened so that the foldable structure is capable of resting back on the triangular base, the bottom triangular corner portion of each of the two elements capable of being folded inwardly so that the two elements are held apart in an open position by the bottom triangular corner portions. A folded tab may also be glued to one interior side, wherein opening the tab maintains the two elements in an open position.

Another embodiment may be a rigid or flexible one-piece formed curved reflective viewing container with a permanent curved shape formed by molding a sheet into the curved container configuration and metalizing the outer (for a clear material) or inner or both surfaces to produce the interior reflective surface. This embodiment may be supported with the viewing opening up and be filled with a liquid to provide objects or live creatures, such as fish, floating (or swimming) in the liquid.

The curved reflective viewing container may be held in the hand of the user or supported on a stand. A bendable sheet of stiff material may be formed into a collar held together with tabs to form a circular stand adjustable to any diameter which will support curved reflective viewing containers of various diameters with the viewing opening oriented up or bent into a half circle connected by a rod with an additional cord for supporting the curved reflective viewing container with the viewing opening sideways. A collar-type bracket may support the curved reflective viewing container and the bracket may be mounted to a wall or object or supported on a horizontal surface. A rigid stand may support any size curved viewing container on a pair of sponge-like spaced bottom supports and also support an object suspension rod in a sleeve. Curved reflective viewing containers may also be suspended from a frame or other external object.

BRIEF DESCRIPTION OF THE DRAWINGS

These and other details and advantages of my invention will be described in connection with the accompanying drawings, which are furnished only by way of illustration and not in limitation of the invention, and in which drawings:

FIG. 8 is a perspective view of an alternate rigid or flexible pre-formed embodiment of the reflective conical viewing container hung in a frame by cords and having a transparent container box and object inside dangling from a cord attached to a rod on the frame and a spring-mounted object suspended inside the reflective conical viewing container;

FIG. 9 is a perspective view of a flexible or rigid pre-formed embodiment of the reflective conical viewing container mounted vertically in a base and partially filled with water with a fish-type object floating in the water;

FIG. 10 is a perspective view of the rigid or flexible pre-formed embodiment of the reflective conical viewing container mounted on a stand with an object holding rod and object inserted from a spring mount on the stand into the viewing opening;

FIG. 11 is a perspective view of the preferred embodiment of the adjustable flexible reflective conical viewing container affixed inside a greeting card, openable and closable with the card and shown in an open position with a notched tab holding the card open;

FIG. 11A is a partial perspective view of a corner of the preferred embodiment of the adjustable flexible reflective conical viewing container affixed inside a greeting card, openable and closable with the card and shown in an open position with a glued-on folded tab holding the card open;

FIG. 12 is a perspective view of the preferred embodiment of the adjustable flexible reflective conical viewing container affixed inside a greeting card with a bottom corner portion of the card removed or folded to allow the card to rest in a tilted back open position;

FIG. 13 is a bottom end view of the card and reflective conical viewing container of FIG. 11 in the closed position;

FIG. 14 is a top elevational view of the reflective conical viewing container held with the viewing opening up, with two balls therein, a first ball in the apex and a second ball rotating around the first as the reflective conical viewing container is moved in a circular motion;

FIG. 15 is a perspective view of the reflective conical viewing container having a transparent cover with a cord attached to the cover for suspending the object;

FIG. 16 is a perspective view of the reflective conical viewing container in a fishbowl;

FIG. 17 is a perspective view showing the preferred embodiment of the invention adjustable to various possible sizes and with a hand-held rod dangling the object;

FIG. 18 is a perspective view showing one embodiment of the spinning object used with the greeting card application of the invention of FIGS. 11–13;

FIG. 19 is a perspective view showing the invention hanging upside down dangling from an external object (shown dashed) as in a mobile or crib toy;

FIG. 37 is a perspective view of a segment of a reflective sphere suspended in a circular transparent frame with an adjustable rod mounted on the frame movably suspending a sculpture therefrom by a transparent cord-like element;

FIG. 38 is a diagrammatic side elevational view of the device of FIG. 37 showing the depth of the segment;

FIG. 39 is a perspective view of a stand for a conical reflective viewing container with a means for holding and adjustably tilting a rod suspending an object by a cord-like element in the near focal field of the viewing container.

BEST MODE FOR CARRYING OUT THE INVENTION

Figure 1:
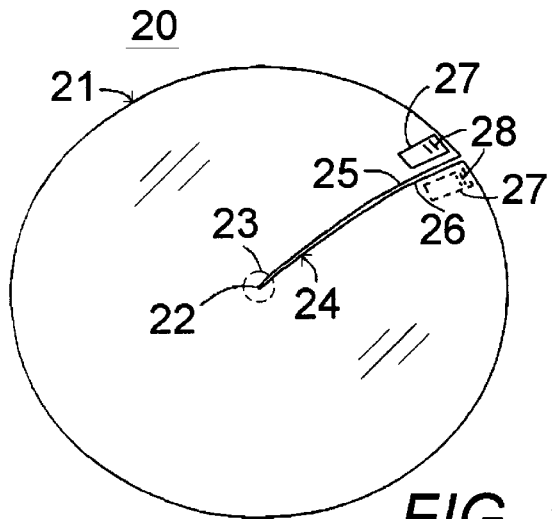
FIG. 1 is a plan view of a disc used to form an adjustable flexible cone, the disc having a reflective surface, a curved radial slit, and provisionally, a circular center opening.

In FIGS. 2, 4, 8–12, 14–16, and 19–38, a reflective curved viewing container 20, 20A, 20B, 20C, 20D, 20E, and 20F receives at least one object 50A, 50B, 50C, 50D, 50E, 50F, 50G 50H, 50J, 50K, 50L, 50M, 50N, 50P, 50Q, 50R, 50S, 50T, 50U, 50V,69, 70A, and 70B of any desired type to be suspended movably and repositionably (in any orientation) in any location within the near focal field of the container for viewing distorted reflections 33 of the object on the interior curved reflective surface 31, 31A, 31B, 70B, and 70C of the container simultaneously with viewing the object.

The reflective curved viewing container comprises a curved structure 20, 20A, 20B, 20C, 20D, 20E, and 20F having an interior curved reflective surface 31, 31A, 31B, 70B, and 70C, a viewing opening 21, 21A, 21B, 21C, 21D, 21E, and 21F formed in the interior curved reflective surface for viewing the interior curved reflective surface, and a near focal field comprising an area within the curved structure and outside the curved structure adjacent to viewing opening. The curved structure is capable of receiving at least one object 50A, 50B, 50C, 50D, 50E, 50F, 50G 50H, 50J, 50K, 50L, 50M, 50N, 50P, 50Q, 50R, 50S, 50T, 50U, 50V, 69, 70A, and 70B of any desired type within the near focal field so that the interior curved reflective surface is capable of emitting reflections 33 of the at least one object visible to a viewer through the viewing opening.

The reflective curved viewing container further comprises a means 40A, 40B, 40C, 40D, 46, 66A, 87, 91, 100, 101, 130, 150, 160, 170, 182, and 200 for suspending the at least one object within the near focal field and a means for causing relative motion of a variety of types of motion and apparent relative motion between the at least one object and the interior curved reflective surface, the interior curved reflective surface being capable of reflecting multiple distorted changing reflections 33 of the at least one object observable by the viewer through the viewing opening as a result of the relative motion and the apparent relative motion, the at least one object observable by the viewer through the viewing opening simultaneously with the reflections.

In FIGS. 2, 4, and 8–12, 14–16, 26, 27, 30–36, and 39 a reflective conical viewing container 20, 20A, 20B, and 20E is a visual effects device for receiving any of a variety of objects 50A, 50B, 50C, 50D, 50E, 50F, 50G 50H, 50J, 50K, 50Q, 50R, 50S, 50T, 50V, and 69 to view the reflected images of the objects in the interior reflective conical surface of the conical viewing container when the objects are suspended within the near focal field of the conical reflective container, including suspending the objects within the container and causing any of a variety of types of relative motion between the objects and the reflective conical container.

Figure 2:
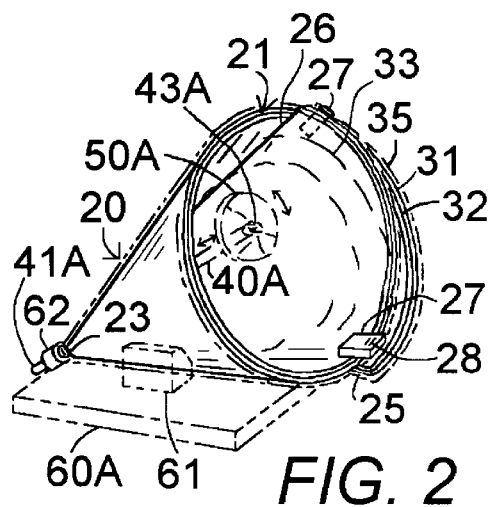
FIG. 2 is a perspective view of the preferred embodiment of the adjustable flexible reflective conical viewing container assembled from the disc of FIG. 1 with a moving object inside suspended by a rod through a circular opening in the apex of the cone.
Figure 4:
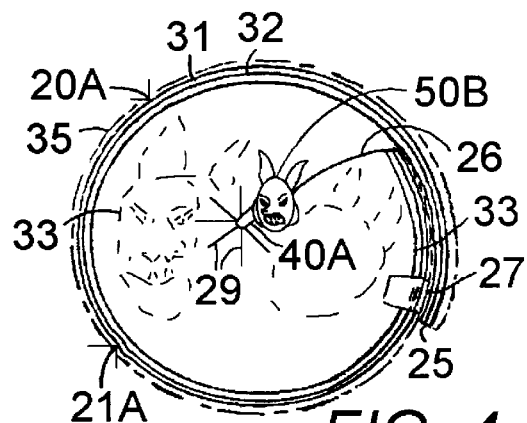
FIG. 4 is a front elevational view looking into an adjustable flexible reflective conical viewing container assembled from the disc of FIG. 3 with a figure object suspended by a rod inserted through the flapped center opening.

A conical structure 32 and 32A has a smooth interior conical reflective surface 31 and 31A, which may actually be on the outside of a transparent layer and viewed therethrough. In FIGS. 2 and 4, a sheet of polyester, such as MYLAR®, or polycarbonate or other scratch resistant transparent layer forms the conical structure 32, which has a metalized coating forming the smooth conical reflective surface 31, the mirror-like metalized surface, on the outside of the conical structure and visible on the inside through the transparent layer 32, the MYLAR® or other clear surface forming a protective coating to prevent scratching. A double reflective surface may be used for viewing reflections both inside (concave reflective surface) and outside (convex reflective surface) the conical viewing container. A transparent protective cone would be used both inside and outside the conical reflective viewing container if the container were not transparent to prevent scratching with a double reflective surface. Semi-reflective surfaces may also be used for seeing the interior reflection and seeing partially through the conical reflective viewing container to view objects or graphics behind the conical reflective viewing container. An additional conical support surface 35 (shown dashed) may act as a structural support of stiffer material used over a thin reflective conical surface, or act as a gripping surface of non-slip material such as polyurethane foam or abraded polycarbonate (grooved polycarbonate sheet), and will also act as an outside scratch resistant surface to protect the metalized reflective layer 31.

Each conical structure 32 and 32A has an apex 22 and 22A at one end, a viewing opening 21 and 21A opposite the apex for viewing the interior conical reflective surface 31 and 3 1A, and a near focal field comprising an area within the conical structure and outside the conical structure adjacent to the viewing opening. The conical structure is capable of receiving at least one object 50A-H, 50J-K, 50P-T, 50V, and 69 therein so that the interior conical reflective surface is capable of emitting reflections 33 of the at least one object visible to a viewer through the viewing opening 21 and 21A.

A means for suspending the at least one object 50A-H, 50J-K, 50P-T, 50V, and 69 within the reflective conical viewing container 20, 20A, 20B, and 20E is provided so that a variety of relative types of motion (a few examples shown by directional arrows) may be achieved between the at least one object and the interior conical reflective surface 31 and 31A as perceived by a viewer through the viewing opening 21 and 21A.

In FIG. 2 the means for suspending the object is a rod 40A having an end 41A mounted through loop 62 in the base 60A, or held in a hand of the user, both of which allow twirling the rod and pushing it in and out to spin and advance or recede the wheel-shaped object 50A which may be multicolored.

In FIG. 4 the means for suspending the object, which is a monster model 50B, may be a rod or handle (not shown) attached to the back of the monster model or the monster model may be held by hand.

In FIG. 8 one means for suspending the object is a rod 40A inserted through a hole 103 in the frame 60B with an attached cord 66A (preferably elastic) or other suspending means suspending a disc-shaped object 50C within a clear holding box 42 attached to the cord by conventional means such as clear tape, glue, or by clamping the box closed to retain the cord between the top and bottom of the box. The box and disc may be bounced, spun, swirled, swung, swivelled, or moved in any other desirable way to produce moving, enlarged and reduced, multiple and single elongated, curved, and other visually interesting reflections 33 in the interior reflective surface 3 1A. The rectangular box produces interesting curved reflections 33. The object could alternately be held by a spring 40B attached to the inside of the apex 22A and the object 50M, in this case a flexible piece with extending arms that dangle and flop when moved, attached to the spring by a clamp, adhesive, or a releasable two-piece hook and loop fastener, allowing swiveling, bouncing, and back and forth motion.

In FIG. 9 the means for suspending the object and for creating any of a variety of types of relative motion between the object and the viewing container is a liquid 46, such as water which may be colored, with the fish-like object 50D floating (or swimming in the case of a live fish) in the water. The base 60C is a hollow ring with a central opening 63 for supporting the reflective conical viewing container 20B vertically.

In FIGS. 10, and 20–25 the means for suspending the object is a rod 40A with a friction-fit collar 45 securing a cord 66A or other suspending means, which may be looped slidably on the rod so that the cord may be adjusted in size. The cord may be elastic, allowing bouncing as well as swinging and jumping and twirling and advancing and retracting the object, which may be a spider-like model 50E, a flexible reflective L multi-armed element 50M, a clear box 42 containing a butterfly 50N, a spinning object 50L or other desired objects. The rod is mounted by a spring 62 to outside base 60D or held in the hand of the user.

In FIGS. 2, 4, and 8–12 the interior conical reflective surface 31 and 31A reflects multiple distorted changing images 33 of the object observable by the viewer through the circular viewing opening 21 and 21A as a result of the relative motion.

In FIGS. 8–10 the conical structure 32A may be a formed piece of plastic or metal or other rigid or flexible but firm material which will hold its conical shape or could also be a flexible reflective cone inside a firm conical holder. The interior reflective conical surface is formed by metalizing the interior surface of the conical structure. A clear protective layer may be used over the metalized surface to prevent scratching.

Figure 3:
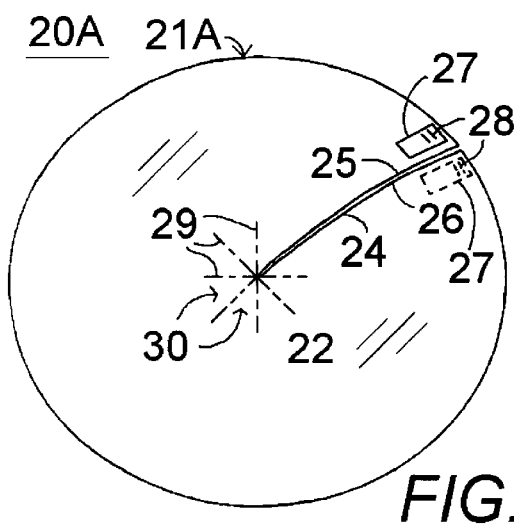
FIG. 3 is a plan view of an alternate embodiment of the disc used to form an adjustable flexible cone, the disc having a reflective surface, a curved radial slit, and provisionally, a series of radial slits forming a flapped center opening.

In FIGS. 1–7, 27, and 35 an adjustable flexible reflective conical viewing container 20 and 20A is fabricated from a sheet of flexible material having at least one reflective side as illustrated in FIGS. 1 and 3, the sheet formed in the shape of a disc having an outer edge 21 and a center point 22, the sheet having a slit 24 formed therein from the center point to the outer edge. A tab 27 of high-friction material, such as moderately soft vinyl, having an outer end and an inner end, is attached to the disc by a permanent attaching means, such as staples 28, adjacent to the slit 24 and adjacent to the outer edge 21 and 21A of the disc on a first side 25 of the slit with the inner end of the tab positioned inwardly of the outer edge toward the center point, the tab contacting the at least one reflective side to form a tabular binding connector 27. The second side 26 of the slit is positioned to overlap the first side 25 of the slit to any desired extent and the outer edge 21 and 21A of the second side 26 of the slit is inserted under the tabular binding connector 27 to hold the second side of the slit in place, the disc thereby being formed into a flexible conical viewing container 20 and 20A. The second side may be extended cut shorter than the tab side or the tab mounted higher on an extension of the tab side to prevent buckling when a tight (small angle of opening) cone is formed. Two tabular binding connectors 27 or other binding means may be used with one adjacent to each of the two sides fastened on opposite surfaces of the disc, as seen in FIGS. 1–3 and 27. Other alternative releasable binding means may include a binding clip, an adhesive means, a squeeze clip, a mating hook and loop fastener, mating holes with a string, wire or other binding means inserted through the holes, or other releasable binding means. The interior conical reflective surface 31 is formed by the at least one reflective surface of the disc, the viewing opening 21 therein being formed by the overlapping outer edge of the disc, and the apex of the cone being formed by the center point 22 of the disc.

A central opening 23 (shown dashed as a circular opening) may be formed in the disc surrounding the center point, as seen in FIG. 1. The central opening 23 is capable of forming an apex opening 23 in the flexible conical viewing container, through which apex opening the at least one object and/or the means for suspending the at least one object may be admitted into the flexible conical viewing container. Alternately the object and holder may be admitted through the viewing opening 21 and 21A.

Alternately, in FIG. 3 the central opening may be formed by a series of radial slits 29 formed in the disc 20A from the center point 22, creating a flapped opening formed by a series of inwardly pointing triangular flaps or tabs 30 which point toward the center point 22. As seen in the conical viewing container of FIG. 4 formed by the disc 20A, the flapped opening may be pushed open to allow a rod 40A to pass through the center flapped opening from inside the conical reflective viewing container out through the flapped opening to an exterior rod support (or held by hand) to suspend an object on the rod, such as the monster FIG. 50B which may be moved in any desired fashion to produce interesting changeable distorted reflections 33 on the interior reflective surface as the monster figure is moved relative to the viewing container.

In FIG. 2 the means for suspending the object, a rotatable disc 50A, comprises a rod 40A, which may be flexible, the rod having a handle end 41A movably secured in a ring mount 62 on the base 60A or held by hand, and a holding end 43A to retain the object by a friction fit or swivel fit or other means. The rod 40A, which is insertable through the apex opening 23, is used to cause the object to spin and to advance and recede within the reflective conical viewing container 20. In FIG. 10 the rod 40A has a retainer ring 45 friction fit over the holding end and a cord 66A secured with a sliding fit between the ring and the rod. The cord 66A, which may be looped and may be elastic, secures the object, a spider-like model 50E in this embodiment, to the rod so that the object is movable relative to the flexible conical viewing container by bouncing, dangling, swinging, twirling, spinning, swishing and other moving means to create changing reflections 33 in the interior reflective conical surface 31A. The rod may be movably secured in a spring holding means 62A mounted on the base 60D or held in the hand of the user.

In FIGS. 2, 8–10 and 27 a support means 60A, 60B, 60C, and 60D for the reflective conical viewing container 20 and 20B is capable of supporting the reflective conical viewing container in any of a variety of configurations. In FIGS. 2 and 10 the support means comprises a base 60A and 60D, respectively, capable of resting on a horizontal surface and at least two high friction support elements 61, preferably four with two on each side, extending vertically from the base, the flexible conical viewing container 20 and 20B fitting between and being supported by the support elements. The size and degree of curvature of the cone makes no difference since the high friction elements 61, which are preferably blocks of non-slip material such as polyurethane foam, will hold the cone resting on them.

In FIG. 2, a means for supporting the reflective conical viewing container 20 and the rod 40A comprises a stand 60A, which rests on a substantially horizontal surface, and a support ring 62 through which the rod is inserted and through which the handle end 41A of the rod may be pushed and pulled and twirled to move the object within the reflective conical viewing container to produce changing multiple reflections 33 in the interior reflective conical surface 31. In FIG. 10 the means for supporting the reflective conical viewing container 20B and the object holding rod 40A comprises a stand having a horizontal base 60D with a support spring 62A to hold the rod 40A which may be moved in any direction and bounced and oscillated by the spring. Alternately, in both cases, the rod may be a flexible rod or a rod having an elasticized cord held in a rigid holder or held in the hand of the user.

In FIG. 8 the support means comprises a frame 60B having at least one cord element 66 or other suspending means, preferably four cord elements, attached thereto, the at least one cord element capable of supporting the reflective conical viewing container 20B attached to the cord elements and suspended movably from the frame by the cord elements, which may be tied or adhered thereto.

Figure 5:
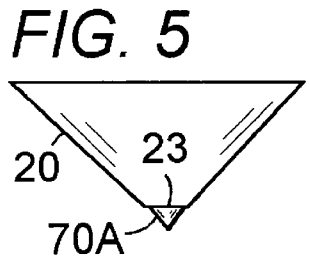
FIG. 5 is a side elevational view of the preferred embodiment of the adjustable flexible reflective conical viewing container of FIG. 2 with a center opening and a tip cap insert filling the apex opening.
Figure 6:
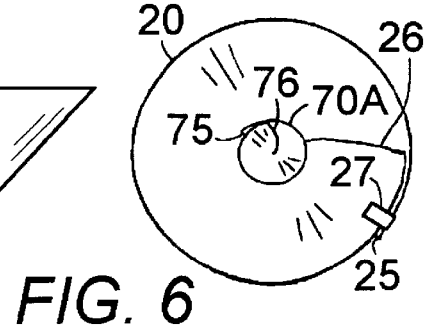
FIG. 6 is a front elevational view looking into the adjustable flexible reflective conical viewing container of FIG. 5.
Figure 7:
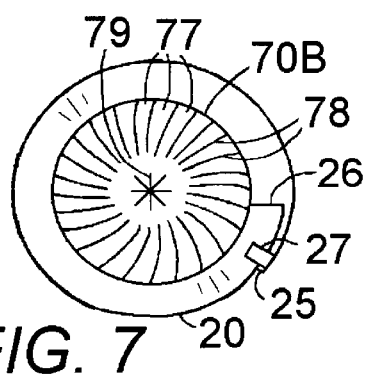
FIG. 7 is a front elevational view looking into the preferred embodiment of the adjustable flexible reflective conical viewing container showing a reflective insert having radial slits around the perimeter and a flapped center opening formed by center radial slits.

FIGS. 5–7 show a conical insert 70A and 70B, having an insert interior conical reflective surface, which conical insert is adjustable to fit within the reflective conical viewing container so that the reflective properties of the interior reflective conical surface of the flexible conical viewing container are changed by the conical insert. The conical insert may also be dangled or otherwise held and moved in the near focal field as an object for creating complex reflections to view, since the object being viewed consists of reflective material.

In FIGS. 5 and 6 the conical insert 70A comprises a second sheet of flexible material having at least one reflective surface and formed into a second disc larger in diameter than the central opening, the second disc having a second outer edge, a second center point, a second slit formed therein from the second center point to the second outer edge to form two second disc sides capable of overlapping to form an apex or point cap having an adjustable conical shape, and an adhesive means for securing the two second sides together in overlapping arrangement, so that the apex cap is capable of being formed into a conical shape to match the conical shape of the flexible conical viewing container and the apex cap is capable of being inserted in the flexible conical viewing container to fill the apex or point opening therein. As seen in FIG. 17, the apex cap is capable of being suspended in the reflective conical viewing container for viewing the reflections of the apex cap therein.

In FIG. 7 the conical insert 70B comprises a third sheet of flexible material having at least one reflective surface and formed into a third disc having a series of radial slits 78 creating a series of reflective tabs 77 around the third disc so that when the third disc is positioned in the reflective conical viewing container the series of reflective tabs creates a series of reflections. The radially slitted conical insert 70B may also be dangled or otherwise held and moved in the near focal field of the conical reflective viewing container as the object to cast reflections to be viewed, as seen in FIG. 19.

In FIGS. 2 and 4, the device further comprises an outer surface 35 (shown dashed as optional) similar in shape to the disc and attached to the disc by adhering, stapling, bonding or other means to form a support therefor with a stiffer, less flexible material or to provide a tactile holding surface, such as a polyurethane foam outer surface, and to form a protective outer coating to prevent the scratching of the metalized conical surface with all types of material.

Figure 30:
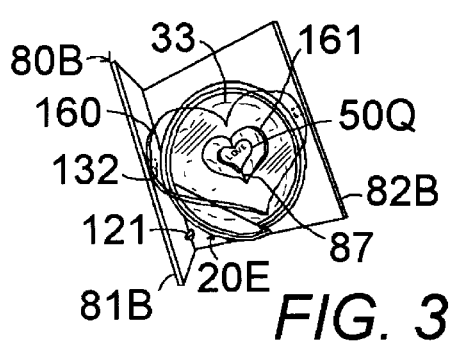
FIG. 30 is a perspective view of the preferred embodiment of the flexible reflective conical viewing container affixed inside a greeting card having a transparent retaining sheet attached to the front and back of the card across the viewing opening of the conical viewing container, the transparent retaining sheet having a central opening with the object suspended therein by a cord-like element.
Figure 32:
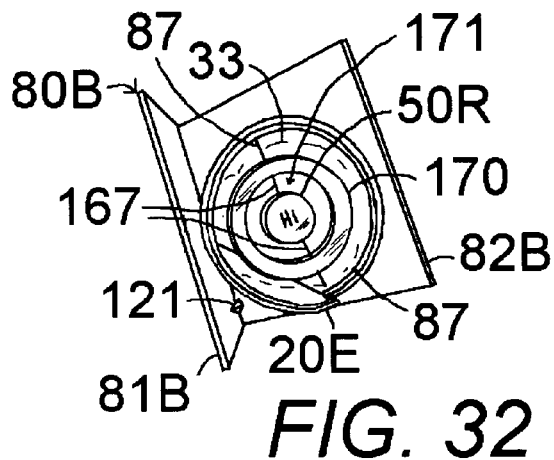
FIG. 32 is a perspective view of the preferred embodiment of the flexible reflective conical viewing container affixed inside a greeting card having a transparent retaining frame attached to the flexible conical viewing container by a pair of vertical elasticized cord-like elements across the viewing opening of the conical viewing container, the transparent retaining sheet having a central opening with the object suspended therein by a pair of vertical elasticized cord-like elements so that the frame may spin about a vertical axis while the object spins about a vertical axis within the frame.
Figure 33:
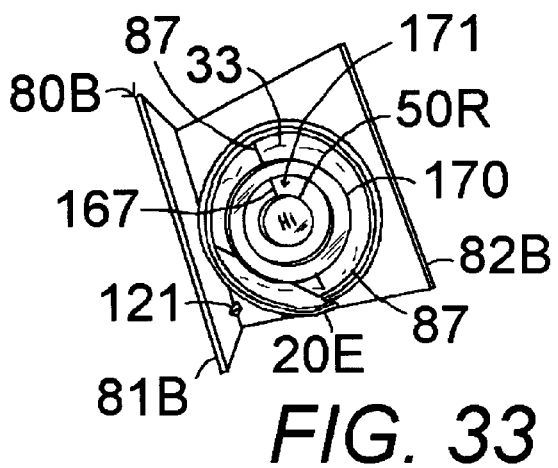
FIG. 33 is a perspective view of the preferred embodiment of the flexible reflective conical viewing container affixed inside a greeting card having a transparent retaining frame attached to the flexible conical viewing container by a pair of vertical elasticized cord-like elements across the viewing opening of the conical viewing container, the transparent retaining sheet having a central opening with the object suspended therein by a single vertical elasticized cord-like element hanging from the frame so that the frame may spin about a vertical axis while the object spins about a vertical axis or dangles or swings or bounces or otherwise moves freely within the frame.
Figure 34:
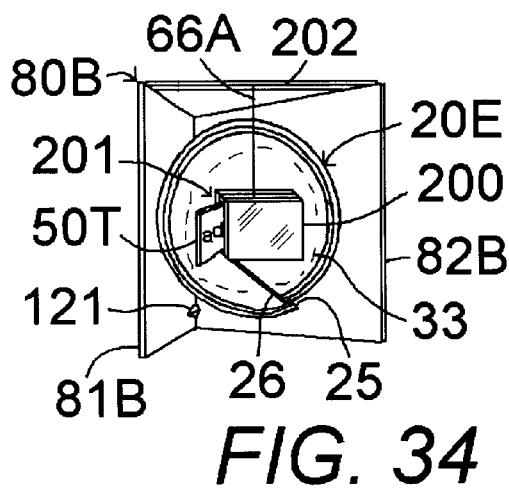
FIG. 34 is a perspective view of the preferred embodiment of the flexible reflective conical viewing container affixed inside a stand-up advertising display having a transparent object holding envelope suspended by a single vertical elasticized cord-like element hanging from a beam-like element attached between the top corners of the open hinged folding elements of the stand-up the frame so that any desired visual advertising message may be inserted in the holding envelope and the holding element is capable of spinning about a vertical axis or dangling or swinging or bouncing or otherwise moving freely in front of the viewing opening of the conical viewing container.
Figure 36:
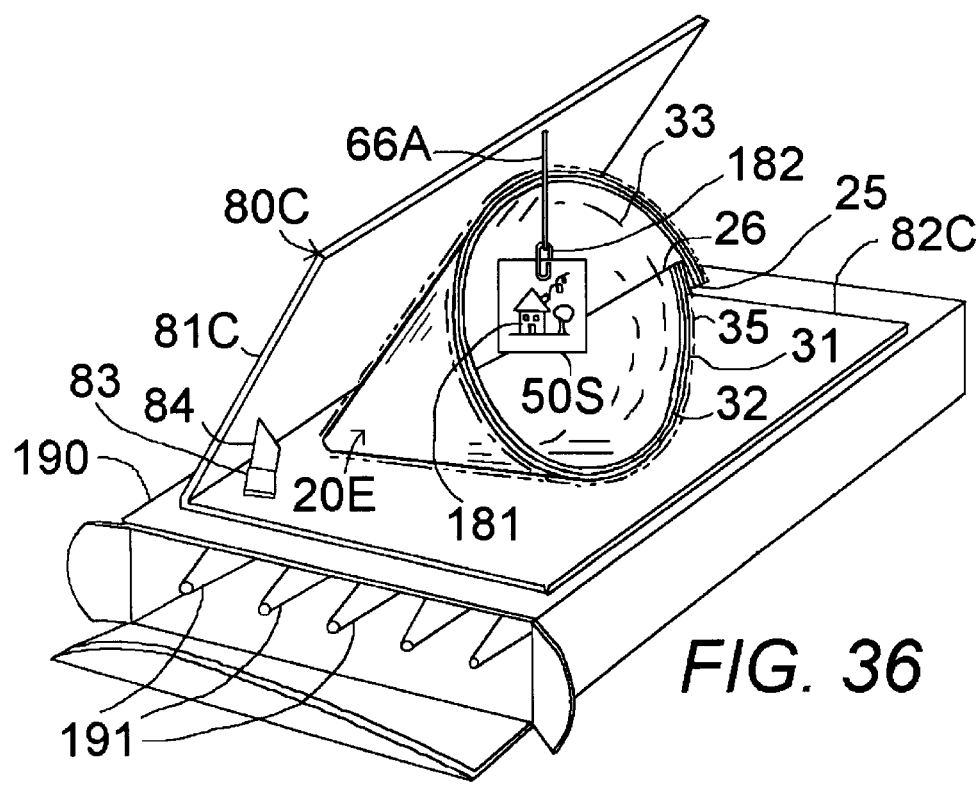
FIG. 36 is a perspective view of the preferred embodiment of the flexible reflective conical viewing container affixed inside a folder attached to an art or craft material box with art or craft work movably suspended in front of the viewing opening of the conical viewing container from an elasticized cord-like element hanging from a top cover of the folder on a clip at the end of the cord-like element.

In FIGS. 11–12, 30–34, and 36 the reflective conical viewing container 20E is formed of a flexible material which is collapsible into a flat configuration, as seen in FIG. 13, and is incorporated into a foldable structure 80, 80A, 80B, and 80C such as a greeting card or stand-up advertising display in FIG. 34 or attached to a box 190 of art tools 191 in FIG. 36, having two elements 81 and 82, 81A and 82A, 81B and 82B, and 81C and 82C such as the front of the card and the back of the card, hingedly connected together, each of the two elements having a flat interior face capable of folding flat together, as seen in FIG. 13. The reflective conical viewing container 20E is attached to the flat interior face of each of the two elements by an adhesive means 85, such as double stick tape or glue, or other conventional means, so that a closing of the two elements by folding the two elements together sandwiches the conical structure flat between the two elements, as seen in FIG. 13, and an opening of the two elements 81 and 82, 81A and 82A, 81B and 82B, and 81C and 82C by pivoting the two elements apart opens the conical structure adjustably to any desired opening size and the opening and closing causes relative motion and apparent relative motion between the reflective conical viewing container 20E and, suspended on an elasticized cord 87 or other suspending means, at least one object 50F, 50G and 50Q-T, which may bear on both sides a greeting visibly reflected as a distorted moving reflective image 33 in the interior conical reflective surface 31. The elasticized cord 87 may be threaded through small holes in the cone or a barb 96 forming a "T" at each end of the elasticized cord may be held in alignment with the cord to pierce a hole through the cone and then turned perpendicular to the cord so that the cord pulls the barb 96 against the outside of the cone to retain the cord. Alternately, the cord may be attached to the reflective cone by tape, glue, knotting the cord ends, or other securing means. The object 50F, 50G, and 50Q-T may be secured to the elasticized cord 87 by threading the cord through holes in the object. Alternately, as seen in FIG. 18, two disc objects 50F may sandwich the elasticized cord 87 between them and be secured by an adhesive or double-sticky tape or other means. A single disc may also be secured in this manner. In FIG. 30 a transparent retaining sheet 160 in the shape of a heart or other desired shapes is attached by tape 132 or other means to the front 81B and back 82B of the card across the viewing opening of the conical viewing container. The transparent retaining sheet has a central opening 161 in the shape of a heart or other desired shape with the object 50Q in the shape of a heart or other desired shape with a greeting, such as "love" or other desired greeting imprinted thereon, the object 50Q suspended in the central opening 161 by a cord-like element 87 which is preferably elasticized to permit winding up the object prior to closing the card so that the object will spin upon opening the card.

The reflective conical viewing container 20E is a flexible material which preferably folds along the second (overlapping) side 26 of the slit and along a fold line 86 on the opposite side of the cone. The overlapping sides of the reflective conical viewing container may be adjusted to the desired amount of overlap and glued or taped together.

In FIGS. 11 and 30–34 an angled cut through the two elements 81 and 82 and 81B and 82B at the hinge forms an angled cut line 120 in each element and creates a triangular tab 121 which may be pushed inside to maintain the two elements in an open position. Alternately, in FIGS. 11A and 36, a folded cardboard tab 83 is glued to the bottom of the card 82 or 82C adjacent to the fold or spaced away from the fold as in FIG. 11A and a foldout portion of the tab 84 folds out by hand to a desired angle to hold the top of the card 81 or 81C open to a desired extent. In FIG. 12 a bottom corner portion 88 of the card is slit adjacent to the bottom along the card fold line and the two triangular corner pieces 89 of the card are folded inwardly to allow the card to rest in a tilted back open position. The two triangular corner pieces 89 folded inwardly hold the card open to any desired extent depending on the amount of folding and thereby eliminate the need for an extra tab attached inside the card. The card may rest on the inwardly folded triangular corner pieces as a base.

The means for suspending the at least one object comprises an elastic cord element 87, such as LYCRA® thread, attached across the viewing opening preferably on or adjacent to the fold lines in the reflective conical viewing container. The elastic cord element 87 has at least one object, such as the circular disc 50F and the wreath-shaped disc 50G and the heart 50Q, all of which may be imprinted with greetings, attached thereto so that the at least one object may be turned by hand or by blowing on the object to spin it to wind up the elastic cord element prior to the closing so that the opening produces a spinning of the at least one object to surprise the person opening the card and create an interesting moving visual effect in the reflections. The object may be made of transparent and translucent as well as opaque material.

In FIG. 30 the preferred embodiment of the flexible reflective conical viewing container 20E is affixed inside a greeting card 80B having a heart-shaped or other-shaped transparent retaining sheet 160 attached to the front 81B and back 82B of the card by tape 132, stitching, gluing, or other means stretching across the viewing opening of the conical viewing container. The transparent retaining sheet 160 has a heart-shaped or other-shaped central opening 161 with the heart-shaped or other shaped and colored object 50Q suspended movably therein by a cord-like element 87 attached to the retaining sheet by taping, gluing, tying, stitching, or other attaching means. The cord-like element is preferably elasticized, enabling the object to be wound up and the card closed, so that the object will spin upon opening the card. The object may be imprinted with an appropriate greeting or saying, such as "LOVE" in this case for a Valentine card. The object may be opaque, transparent, or translucent and colored and shaped as desired with imprinting and designs.

Figure 31:
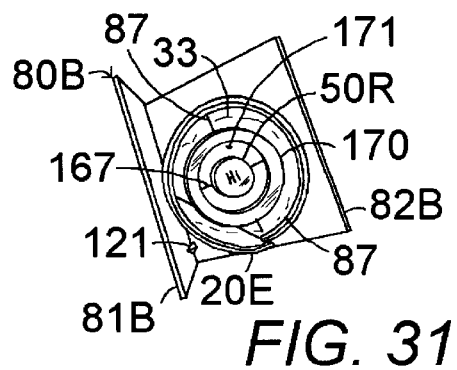
FIG. 31 is a perspective view of the preferred embodiment of the flexible reflective conical viewing container affixed inside a greeting card having a transparent retaining frame attached to the flexible conical viewing container by a pair of vertical elasticized cord-like elements across the viewing opening of the conical viewing container, the transparent retaining sheet having a central opening with the object suspended therein by a pair of horizontal elasticized cord-like elements so that the frame may spin about a vertical axis while the object spins about a horizontal axis within the frame.

In FIGS. 31–33 the preferred embodiment of the flexible reflective conical viewing container 20E is affixed inside a greeting card 80B. A transparent retaining frame 170 is attached to the flexible conical viewing container by a pair of vertical elasticized cord-like elements 87 across the viewing opening of the conical viewing container. The transparent retaining frame 170 has a central opening 171 and suspended movably therein an object 50R, which may be shaped, colored, transparent, translucent, solid, imprinted, embellished, or otherwise visually equipped as desired. In FIG. 31 the object 50R is suspended in the opening of the retaining frame by a pair of horizontal elasticized cord-like elements 167 so that the frame may spin about a vertical axis while the object spins about a horizontal axis within the frame. In FIG. 32 the object 50R is suspended in the opening of the retaining frame by a pair of vertical elasticized cord-like elements 167 so that the frame may spin about a vertical axis while the object spins about a vertical axis within the frame. In FIG. 33 the object 50R is suspended in the opening of the retaining frame by a single vertical elasticized cord-like element 167 hanging from the retaining frame so that the retaining frame may spin about a vertical axis while the object spins about a vertical axis or dangles or swings or bounces or otherwise moves freely within the retaining frame opening.

In FIG. 34 the preferred embodiment of the flexible reflective conical viewing container 20E is affixed inside a stand-up advertising display 80B by tape or gluing or other attaching means to the front cover 81B and back cover 82B. A transparent object holding envelope 200, which may be plastic or other clear material, is suspended by a single vertical elasticized cord-like element 66A hanging from a beam-like element 202 which may be a flexible strip or a strip of stiff paper, cardboard, plastic, thin metal, or other relatively stiff material attached between the top corners of the open hinged covers 81B and 82B of the stand-up the frame. Any desired visual advertising message 50T may be inserted in the holding envelope 200 and the holding envelope, or a greeting suspended therefrom and the envelope or greeting is capable of spinning about a vertical axis or dangling or swinging or bouncing or otherwise moving freely in front of the viewing opening of the conical viewing container.

Figure 35:
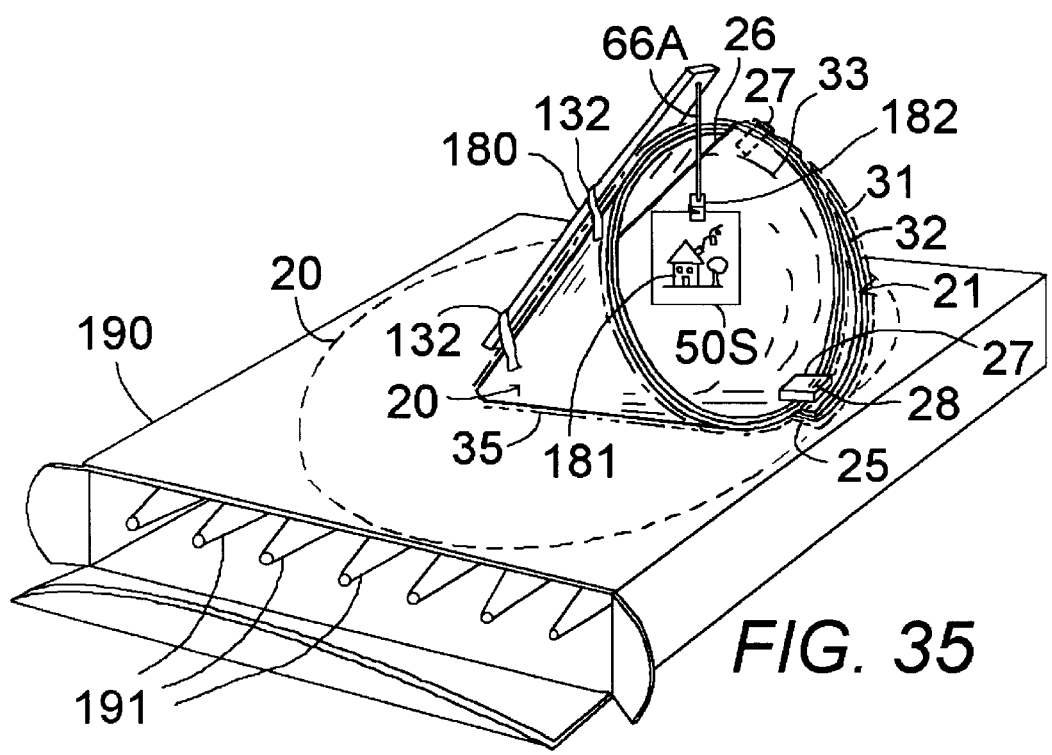
FIG. 35 is a perspective view of the preferred embodiment of the adjustable flexible reflective conical viewing container with the disc of FIG. 1 (shown dashed) attached by one edge to an art or craft material box and assembled from the disc into an adjustable flexible reflective viewing container on the box with art or craft work movably suspended in front of the viewing opening of the conical viewing container from an elasticized cord-like element hanging from a flat supporting bar attached to the top side of the conical viewing container on a clip at the end of the cord-like element.

In FIG. 35 the preferred embodiment of the adjustable flexible reflective conical viewing container 20 is packaged in the form of the disc of FIG. 1 (shown dashed) attached by one edge 25 to an art or craft material box 190 to create an art or craft creation and viewing kit. The disc may then be assembled into an adjustable flexible reflective viewing container 20 (shown solid) on the box. Art or craft work 50S, made on paper, transparent plastic, or other material with the art or craft materials 191 such as crayons, colored pencils, markers or other such materials from the box, is movably suspended in front of the viewing opening of the conical viewing container from an elasticized cord-like element 66A hanging from a flat supporting bar 180 of flexible material, such as cardboard, stiff paper, plastic, thin metal or other such material, attached by tape 132 or other adhesive to the top side of the conical viewing container. A clip 182, such as a spring-loaded clip, paper clip, or other means to hold paper and small objects, is attached by tying or tape or other means to the end of the cord-like element 66A for easily attaching and removing the art or craft element 50S to the clip.

In FIG. 36 the preferred embodiment of the flexible reflective conical viewing container 20E is affixed by gluing, tape, or other attaching means inside a card-like folder 80C attached to an art or craft material box 190 by tape, adhesive, or other attaching means between the bottom cover 82C and the box 190 to create an art or craft creation and viewing kit. Art or craft work 50S, made on paper, transparent plastic, or other material with the art or craft materials 191 such as crayons, colored pencils, markers or other such materials from the box, is movably suspended in front of the viewing opening of the conical viewing container from an elasticized cord-like element 66A hanging from the top cover 81C of the folder by insertion of the cord-like element through and hole in the top cover and tying the end of the cord-like element, by tape, by gluing, or by other attaching means. A clip 182, such as a spring-loaded clip, paper clip, or other means to hold paper and small objects, is attached by tying or tape or other means to the end of the cord-like element 66A for easily attaching and removing the art or craft element SOS to the clip. A folded cardboard tab 83 is glued to the bottom cover 82C of the folder and a foldout portion of the tab 84 folds out by hand to a desired angle to hold the top cover 81C open to a desired extent.

In FIG. 14 the reflective conical viewing container 20B, shown as a rigid structure, which could be flexible as well, contains two balls, having a first ball 50J resting in the apex of the reflective conical viewing container and the second ball 50H rolling around the first, as indicated by the interior arrow, as the reflective conical viewing container is moved in a circular direction or swirled in a circular configuration around the apex, as indicated by the exterior arrow, producing striking active images 33 in motion in the interior reflective conical surface.

In FIG. 15 a rigid or flexible reflective conical viewing container 20B has a transparent cover 90 with a cord 91, preferably elasticized or a transparent monofilament or other suspending means, attached to the edge or center of the cover supporting an object, such as a spiral shape 50K formed of paper, plastic, or other material, suspended therefrom and dangling therein to produce dynamic reflected images 33 in the interior conical reflective surface. The cover may be sealed onto the reflective conical viewing container by glueing or other means to prevent access to the object, as might be used in a toy for an infant. The cover might then serve as a holder for the reflective conical viewing container. Both the reflective conical viewing container and the cover may be formed of tough flexible material, such as polycarbonate, and the container may alternatively be filled with liquid with an object or objects floating inside, the liquid serving as the means for suspending any of a variety of objects and for creating a variety of types of relative motion between the object or objects and the container, as in FIG. 9. The cover may be formed of a Fresnel lens or other material to create magnification or other optical effects.

In FIG. 16 a reflective conical viewing container 20 with an end opening 23 is placed in a fishbowl 95 containing water 46 and at least one fish 50D which swims into the reflective conical viewing container to produce dynamic, distorted images 33 in the interior conical reflective surface.

In FIG. 17 the preferred embodiment of the reflective conical viewing container 20 is shown being formed in any of a variety of differently shaped conical configurations with different opening angles and opening diameters (shown dashed). A rod 40A is held by hand and an apex cap 70A is shown as the object being dangled from the rod to observe the reflections 33.

In FIG. 19, the supporting means comprises a cord-like element 100 or any other suspending means suspended from an exterior object (shown dashed) above the reflective conical viewing container 20, the cord-like element attached to any outside portion of the reflective conical viewing container such as the apex, so that the reflective conical viewing container faces downwardly and is capable of being viewed from below, as in a mobile or crib toy. The means for suspending the object comprises a cord-like element 100/ 101 or any other suspending means which may be either the same cord-like element 100 supporting the cone or a separate cord 101 hanging from the apex or other interior point, extending down into the reflective conical viewing container. The object being dangled is the third disc insert 70B with the tabs dangling to be viewed as a reflected image 33. Any means, flexible or rigid, may be used to suspend the conical reflective viewing container facing downwardly. The cord-like elements may be elasticized cords so that pulling on the object or the cords or the reflective conical viewing container sets it into either a swaying or bouncing movement.

Figure 20:
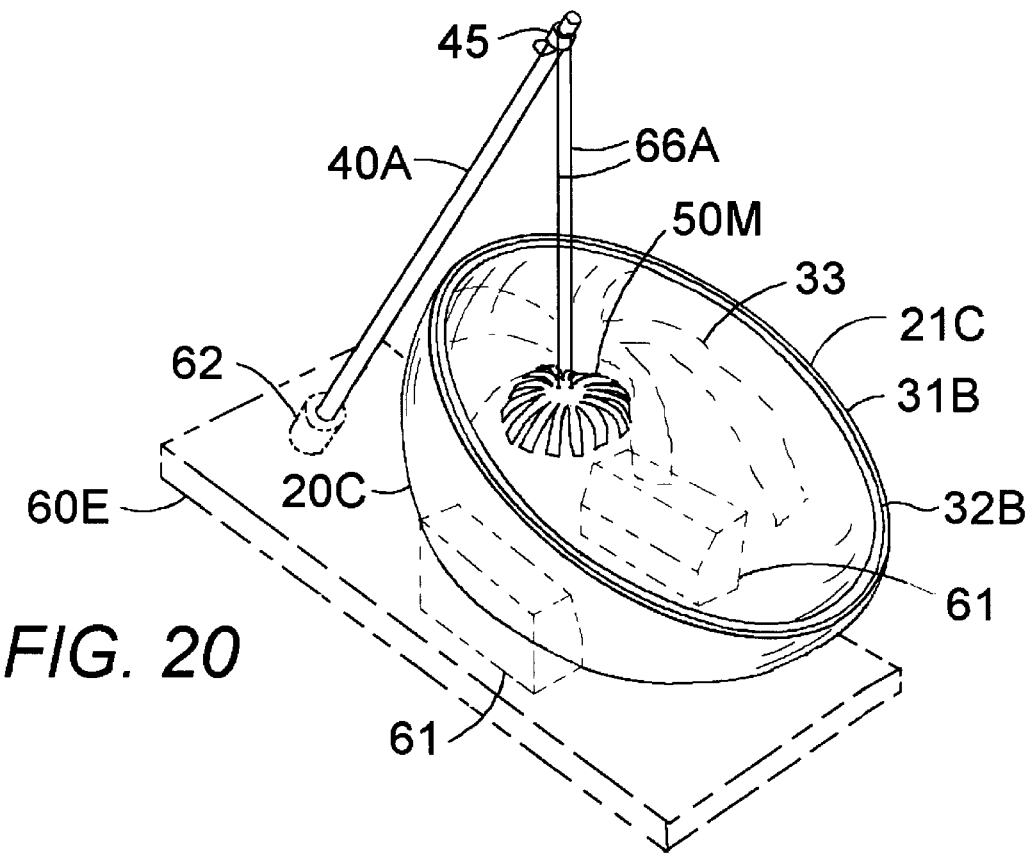
FIG. 20 is a perspective view of an alternate embodiment of the invention having a reflective viewing container with a bowl-shaped interior reflective surface shown mounted on a stand which also supports the device for suspending and moving any desired object.

In FIG. 20, the curved reflective viewing container 20C is formed by a bowl-shaped structure 32B, which may be a hemispherical shape and may be rigid or flexible, having an interior curved reflective surface 31B formed by metalizing the bowl-shaped structure. The metalized surface may be coated with a transparent protective layer. If the bowl-shaped structure is transparent, the exterior may be metalized with the metalized surface visible on the interior of the bowl-shaped structure to produce the desired distorted images therein. The container 20C rests on a stand having a bottom platform 60E with attached high-friction tapered support blocks 61 (at least one on each side) which may be formed of polyurethane foam, or other non-slip material. The platform may also be provided with an attached ring 62 to receive the flexible rod 40A and looped cord member 66A or other suspending means (which may be elasticized) serving as the means for suspending the object, which may be a flexible reflective multi-armed element 50M. The rod and cord member create any of a variety of types of relative motion between the object and the viewing container by manipulating the rod and the cord member. The distorted reflections 33 of the object are visible simultaneously with the object.

Figure 21:
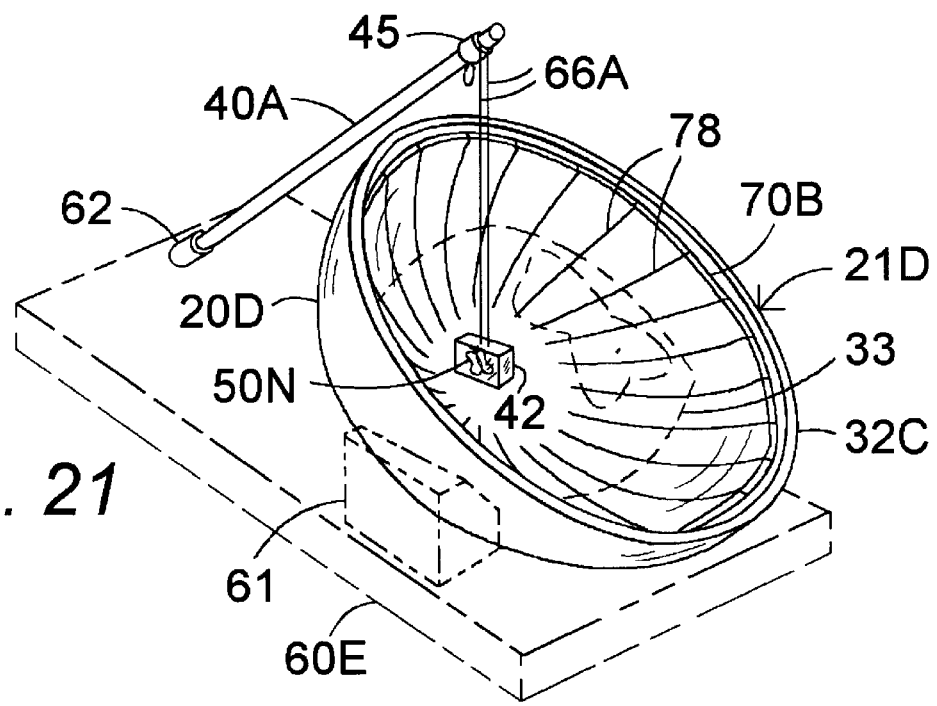
FIG. 21 is a perspective view of an alternate embodiment of the invention having a reflective disc with radial slits around the perimeter used as an insert in a curved bowl-shaped container to form the interior curved reflective surface.

In FIG. 21, the interior curved reflective surface is formed by a container insert 70B comprising a third sheet of flexible material having at least one reflective surface and formed into a third disc having an outer edge and a center point and a series of radial slits 78 extending from the outer edge toward the center point creating a series of reflective tabs around the third disc so that when the third disc is positioned in the reflective curved viewing container the third disc conforms to the shape of the reflective curved viewing container and the third disc forms the interior curved reflective surface. The third disc is further capable of being used as an object to be viewed suspended in the near focal field as shown in FIG. 19 and FIG. 20.

Figure 22:
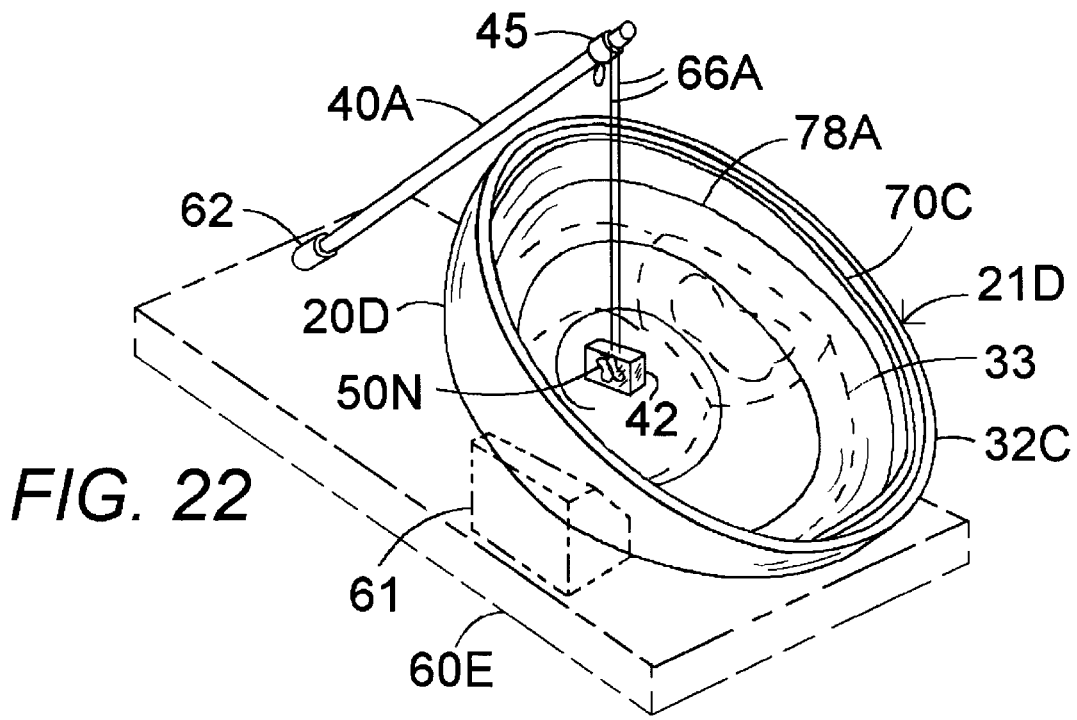
FIG. 22 is a perspective view of an alternate embodiment of the invention having a reflective disc with a spiral slit from the center out to the outer edge used as an insert in a curved bowl-shaped container to form the interior curved reflective surface.

In FIG. 22 the interior curved reflective surface comprises another container insert 70C comprising a fourth sheet of flexible material having at least one reflective surface and formed into a fourth disc having an outer edge and a center point and a spiral slit 78A extending from the center point to the outer edge so that when the fourth disc is positioned in the reflective curved viewing container the fourth disc conforms to the shape of the reflective curved viewing container and the fourth disc forms the interior curved reflective surface. The fourth disc is further capable of being used as an object to be viewed suspended in the near focal field, as seen in FIG. 15 with a reduced size version of a spiral shape reflective object 50K.

Figure 23:
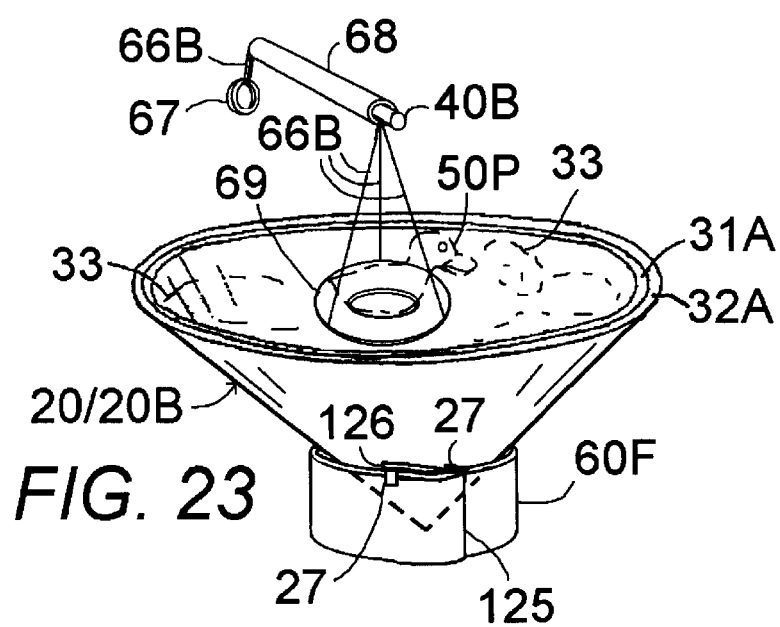
FIG. 23 is a perspective view of a solid or flexible embodiment of the reflective conical viewing container mounted on an adjustable collar stand with the viewing opening up and showing an object suspending torus attached by three cords from a rod within a tube retaining handle.

In FIG. 23 a flexible or rigid reflective conical viewing container 20A/20B is supported with the viewing opening oriented up and the apex resting in a collar 60F formed by a bendable strip of stiff material with a tab 27 adjacent to each end 125 and 126 of the strip, one facing in and the other facing out, with the ends of the strip overlapping and each end engaged in the tab of the other end, so that the strip is formed into a collar adjustable in size to hold a variety of differently sized or differently configured viewing containers.

A preferred embodiment of the object holding means comprises a rod 40B inserted in a tube 68 with a sliding friction fit so that a cord 66B is held in place therebetween. A ring 67 at one end may be pulled to adjust the length of cord 66B hanging from the other end suspending a flexible transparent ring 69 by three strands of the cord with an object, such as a toy duck 50P, resting in the ring and moved by the holding means to create variable reflections 33.

Figure 24:
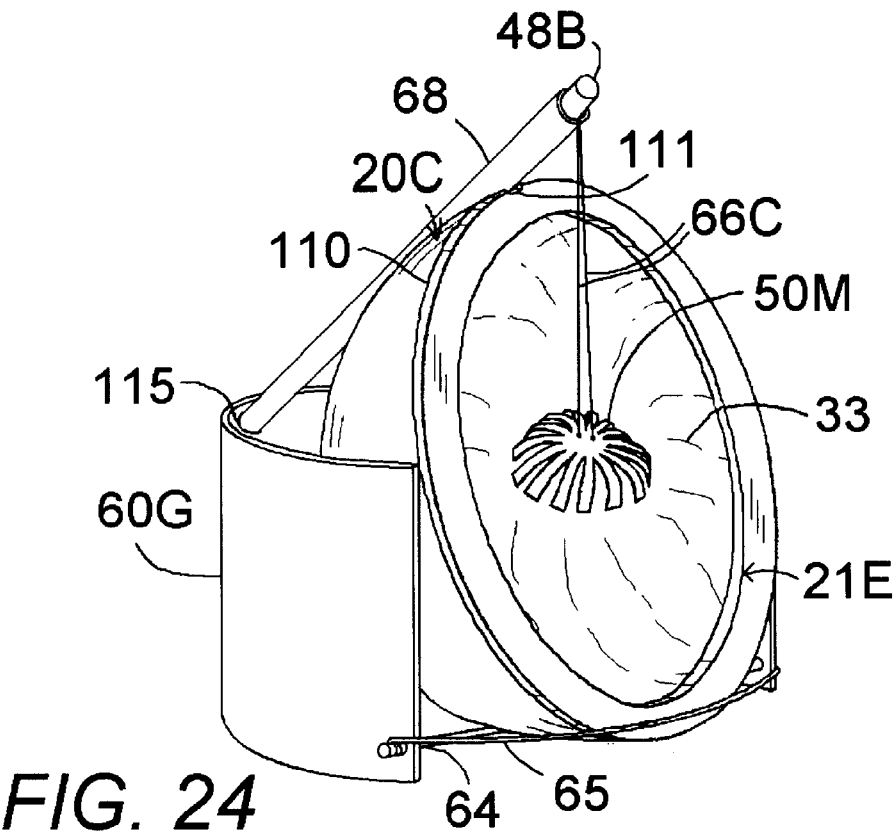
FIG. 24 is a perspective view of an alternate embodiment of the invention having a bowl-shaped reflective viewing container having a rim ring and mounted on a half-collar stand with the viewing opening facing forward and employing the rod within a tube retaining handle of FIG. 23 with the rod mounted on the half-collar stand.

In FIG. 24 a bowl-shaped reflective viewing container 20C (which may be a hemisphere) is provided with a rim ring 110 around the viewing opening to cover circular light reflections normally viewable at the edges of a hemispheric reflector. The curved reflective viewing container 20C is held with the viewing opening facing sideways by a stand formed of a strip of stiff bendable material formed into a half-collar stand 60G and held rigid by a stiff rod 64 inserted through a hole in each end of the strip and a retaining cord 65 to hold the bottom edge of the viewing container which rests on the half-collar stand. The rod 48B and tube 68 retaining handle as described relative to FIG. 23 is held in the half-collar stand 60G by insertion in a hole 115 in the stand or other holding means. The tube rests in a notch 111 in the top of the ring and the end of the tube and rod 48B extend out beyond the rim so that the object 50M dangles in the near focal field in front of the bowl-shaped reflective viewing container 20C for viewing the reflections of the object.

Figure 25:
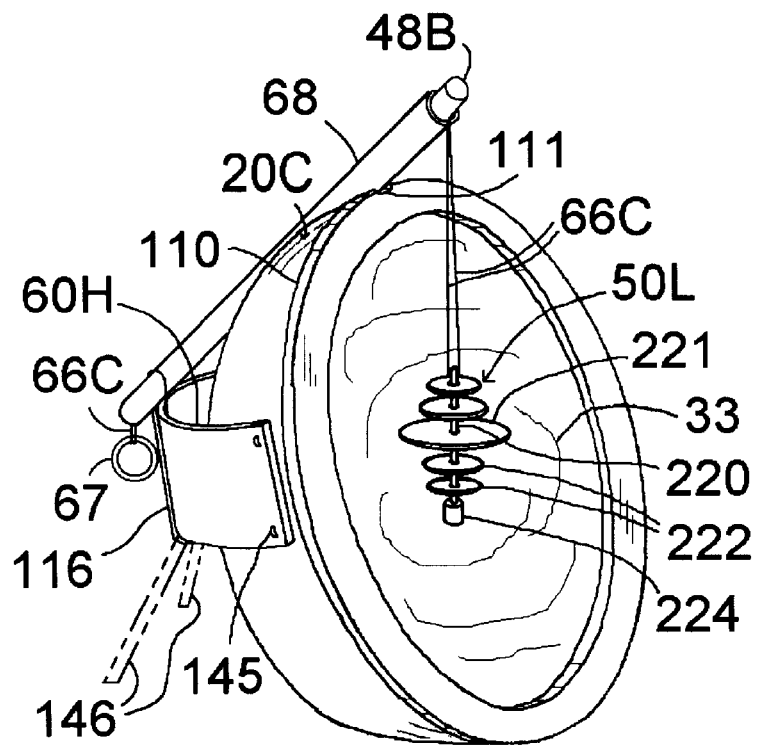
FIG. 25 is a perspective view of an alternate embodiment of the invention having a bowl-shaped reflective viewing container having a rim ring and mounted on a collar bracket with the viewing opening facing forward and employing the rod within a tube retaining handle of FIG. 23.

In FIG. 25 an alternate embodiment of the invention has a bowl-shaped reflective viewing container 20C having a rim ring 110 and mounted on a half-collar bracket 60H with the viewing opening facing forward. The half-collar bracket 60H may be mounted on a wall or external object or supported by a pair of legs 146 (shown dashed) through a hole in the half-collar bracket or other supporting means on a horizontal surface. The rod 48B and tube 68 retaining handle as described relative to FIG. 23 is held in the half-collar bracket 60H by insertion of the tube through a looped cord 116 around the half-collar bracket to allow movement of the tube around the half-collar bracket. The tube rests in a notch 111 in the top of the ring and the end of the tube and rod 48B extend out beyond the rim so that the object 50M dangles in the near focal field in front of the bowl-shaped reflective viewing container 20C for viewing the reflections of the object. The viewing object comprises a spinning object 50L having a vertical rod 220 suspended by an end loop of the cord-like element 66C with a central disc 221 permanently secured to the vertical rod 220 and various other discs 222 having center holes all slipped onto the vertical rod 220 above and below the central disc 221 and a piece of vinyl tubing 224 frictionally attached to the bottom of the vertical rod 220 to prevent the discs 222 from slipping off. The central disc 221 and other discs 222 may be variously colored with different degrees of transparency and reflectivity and with different optical qualities. Twirling the spinning object 50L causes interesting moving reflections 33.

Figure 26:
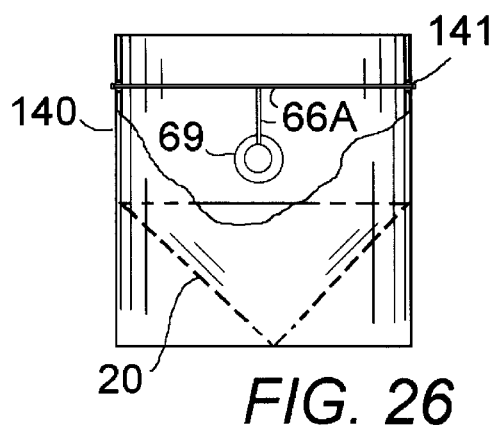
FIG. 26 is a side elevational view in partial section of an alternate embodiment of the invention having a conical reflective viewing container mounted in a cylindrical holder with a cord-like element across the cylindrical holder having a hanging cord-like retaining means for suspending the object.

In FIG. 26 an alternate embodiment of the invention has a conical reflective viewing container 20 mounted in a cylindrical holder 140 with a cord-like element 66A across the cylindrical holder through holes in the cylindrical holder and retained therein by end knots 141 in the cord-like element 66A and having a hanging cord-like retaining means 66A for suspending the object which may be a colored donut-shaped ring 69 or something held by the ring. Objects may be suspended at any height in the near focal field immediately above or within the conical reflective viewing container and moved relative thereto. The cylinder may be transparent or reflective or a combination. The conical reflective viewing container may be attached to the cylindrical holder by tape or adhesive or other means or merely supported therein with a friction fit.

Figure 27:
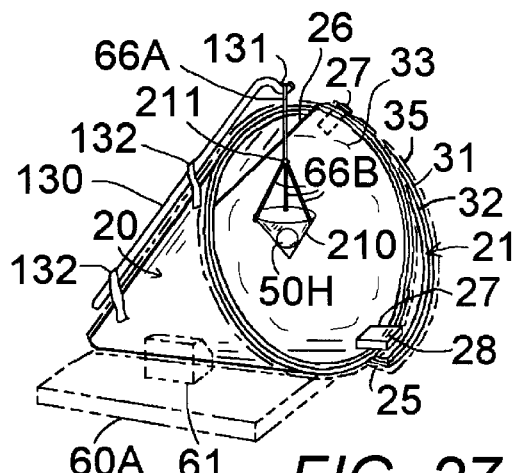
FIG. 27 is a perspective view of the preferred embodiment of the adjustable flexible reflective conical viewing container assembled from the disc of FIG. 1 having a wire mounted on the conical viewing container with a cord-like retaining means for suspending the object.

In FIG. 27 the preferred embodiment of the adjustable flexible reflective conical viewing container 20 assembled from the disc of FIG. 1 has a wire 130 mounted on the conical reflective viewing container with an elastic cord-like retaining means 66A attached by a knot 211 or other means to three or four strands of clear inelastic cord-like elements 66B which are tied to a clear cone-shaped or other-shaped cup 210 through holes in the sides of the cup for containing and suspending the object, a colored ball 50H or other object movably within the near focal field of the conical reflective viewing container. The elastic cord-like element 66A is tied or otherwise secured to a bent end 131 of the wire which extends out over the viewing opening. The wire is secured by tape 132 or other means to the exterior of the conical reflective viewing container.

Figure 28:
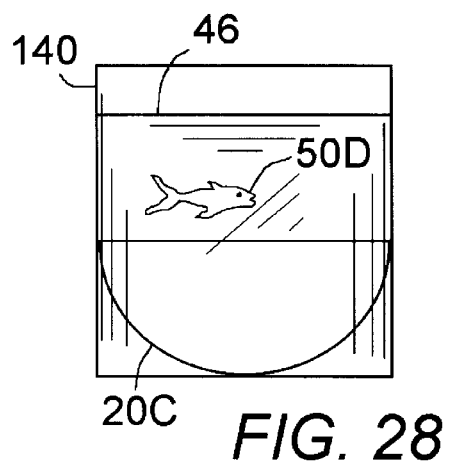
FIG. 28 is a side elevational view of an alternate embodiment of the invention having a dome-shaped reflective viewing container mounted with a watertight connection inside a cylindrical transparent holder partially filled with liquid for suspending objects or swimming creatures in the liquid.

In FIG. 28 an alternate embodiment of the invention has a dome-shaped reflective viewing container 20C mounted with a watertight connection inside a cylindrical transparent holder 140 partially filled with liquid 46, such as water, for movably suspending objects or swimming creatures, such as a fish 50D, in the liquid in the near focal field immediately above or within the dome-shaped reflective viewing container.

Figure 29:
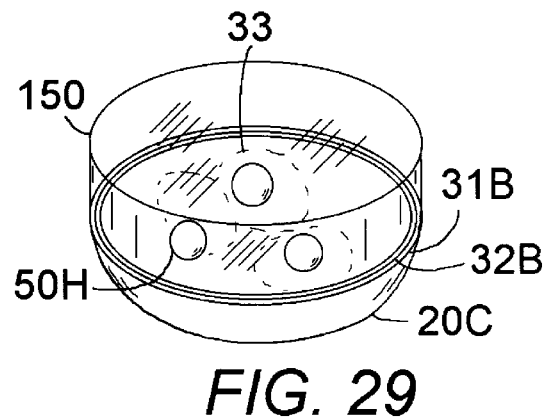
FIG. 29 is a perspective view of an alternate embodiment of the invention having a bowl-shaped reflective viewing container with a clear plastic container mounted over the opening of the viewing container for suspending and containing the object or objects.

In FIG. 29 an alternate embodiment of the invention has a bowl-shaped reflective viewing container 20C with a clear plastic disk-shaped container 150 mounted over the opening of the viewing container for movably suspending and containing the object or objects, such as colored balls 50H therein. The clear container 150 may have a flat or curved bottom and top.

In FIGS. 37 and 38, the curved structure comprises a segment of a sphere 20F formed of a reflective material, such as metalized MYLAR® or flexible polycarbonate, having a depth, indicated by the two-headed arrow 220, from the viewing opening 21F to a deepest point on the reflective surface visible on the concave surface, which is less than one fifth of the diameter of the sphere so that the reflective image 33 is capable of filling the entire reflective surface with no peripheral reflected rings.

A support frame 60J is formed of a strip of bendable material, such as an elongated strip of transparent polycarbonate or a thin strip of metal such as stainless steel or aluminum, formed into a ring or hoop shape with overlapping ends interconnected by a conventional means such as transparent pins 204 or adhesive or other means. The hoop frames could also be heat formed from a transparent strip of a variety of plastic, such as acrylic or a thicker polycarbonate. The segment of the sphere 20F is centrally positioned within the support frame and suspended therefrom by at least one transparent cord-like element 66A, which could be transparent nylon filament, so that the ring support frame 60J frames the segment of the sphere 20F. If a single transparent cord-like element 66A suspends the segment of the sphere 20F, it will be able to rotate. If additional transparent cord-like elements 66E on the sides of the segment of the sphere 20F through frame holes 201 and segment holes 203, the segment of the sphere 20F will remain stationary within the frame.

An adjustable holding rod 40C, formed of a stiff material, such as a transparent acrylic rod or a stainless steel rod or an aluminum rod, is movably attached in a horizontal orientation to a top of the ring support frame 60J by a holding means, such as a loop of transparent plastic 200 or wires or other means, which allows sliding of the adjustable holding rod with a working end of the adjustable holding rod protruding beyond the ring support frame. The holding rod 40C has a piece of sculpture 50U suspended therefrom by a transparent cord-like element 66A, so that the adjustable holding rod is capable of moving the sculpture toward or away from the curved reflective surface of the segment of the sphere 20F from a real reflected image position to a virtual reflected image position within the near focal field to alter the reflections. The sculpture is capable of swinging and spinning on the transparent cord-like element to produce moving appearing and disappearing reflections which sometimes appear to pop out at the viewer, the sculpture and the reflections being visible simultaneously in front of the viewing opening.

In FIG. 39, a support means for the reflective curved viewing container comprising a base 60K, which may be formed of cardboard or other stiff material, which base is capable of resting on a horizontal surface. An object suspending means on the base comprises an angled rod 40D capable of being movably attached to the base, the base capable of receiving the reflective curved viewing container, which may be an adjustable flexible conical reflective viewing container 20, resting thereon. The curved reflective viewing container 20 further comprising a means, such as a section of clear vinyl tubing 216 having a slit 215, for attaching the curved reflective viewing container 20 to the angled rod 40D with the section of tubing 216 slipped through a pair of slits in the conical support surface 35, or otherwise secured to the curved reflective viewing container 20, and around the angled rod 40D. The base 60K has a first planar surface 206 pivotally attached thereto by a hinging means, which could be a first bend 207 in the cardboard, a second planar surface 208 pivotally attached to the first planar surface by a hinging means, which could be a second bend 205 in the cardboard. The second planar surface 208 has a rod opening 209 therein adjacent to the first planar surface, a bottom edge adjacent to the base, and a tab 210 protruding from the bottom edge (attached by gluing or formed as an extension of the bottom edge), the tab held slidably by a strip of cardboard 212 or other material overlapping the tab 210 and adhered to the base at two ends. The angled rod 40D comprises a proximal end movably insertable in the rod opening 209 in the second planar surface 208, which seats in a hole in the base (not shown) or other stabilizing means, and a distal end with a cord-like element 66A attached thereto. The cord-like element 66A having an object suspending means, which could be a transparent sphere 42A having a slit opening 211 separating two halves of the sphere to admit a viewing object such as an action FIG. 50V therein or other object holding means, so that with the angled rod 40D positioned in the rod opening 209 and the curved reflective viewing container 20 attached to the rod, the object suspending means is capable of suspending the object movably within the near focal field of the reflective curved viewing container. Moving the tab 210 alters the angle of the angled rod repositioning the object 50V and the curved reflective viewing container 20.

It is understood that this preceding description is given merely by way of illustration and not in limitation of the invention and that various modifications may be made thereto without departing from the spirit of the invention as claimed.

What is claimed is:

1. A reflective curved viewing container device for receiving at least one object of any desired type to be viewed therein, wherein the device comprises:

a curved structure having an interior concave surface, an exterior convex surface, a curved reflective surface visible on the interior concave surface, a viewing opening formed in the curved structure for viewing the curved reflective surface, and a near focal field comprising an area within the curved structure and outside the curved structure adjacent to the viewing opening, the curved structure capable of receiving the at least one object of any desired type within the near focal field so that the curved reflective surface is capable of emitting reflections of the at least one object visible to a viewer through the viewing opening;

a means for suspending the at least one object at any location and in any orientation in the near focal field so that the object and the curved reflective surface are visible through the viewing opening, the means for suspending the at least one object capable of being used for suspending a variety of objects interchangeably, and a means for causing a variety of types of relative motion and apparent relative motion between the at least one object and the curved reflective surface, the curved reflective surface being capable of reflecting multiple distorted changing reflections of the at least one object observable by the viewer through the viewing opening as a result of the relative motion and the apparent relative motion, the at least one object observable by the viewer through the viewing opening simultaneously with the reflections.

2. The device of claim 1 wherein the curved structure comprises:

a sheet of flexible material having at least one reflective side, the sheet formed in the shape of a disc having an outer edge and a center point, the sheet having a slit formed therein from the center point to the outer edge forming a first side and a second side of the slit, the second side of the slit capable of overlapping the first side of the slit to any desired extent, the disc thereby being formed into a flexible conical viewing container formable to a conical shape of any desired angle of opening for varying the quality and type of reflected image, the interior conical reflective surface being formed by the at least one reflective surface of the disc, the outer edge of the disc forming the viewing opening therein, and the center point of the disc forming an apex of the conical viewing container;

an adjustable means for removably and adjustably securing the overlapping sides of the slit together to any desired extent of overlap for creating a conical viewing container having any desired angle of opening.

3. The device of claim 2 wherein the adjustable means for securing the overlapping sides of the slit together comprises at least one tab of high-friction material having an outer end facing out of the viewing opening and an inner end facing into the viewing opening, the at least one tab attached to the disc by a permanent attaching means connecting the outer end of the tab to the outer extended edge of the disc adjacent to the slit on one side of the slit, and the outer edge of the other side of the slit capable of being inserted under the tabular binding connector to hold the sides in place.

4. The device of claim 2 further comprising a support surface similar in shape to the disc, the support surface shaped and positioned to cover the back side of the at least one reflective surface as a protective coating and gripping surface.

5. The device of claim 2 further comprising a central opening in the disc surrounding the center point, which central opening is capable of forming an apex opening in the flexible conical viewing container to prevent binding when the disc is formed into a small diameter flexible conical viewing container, and wherein the apex opening is capable of admitting the means for suspending the at least one object therethrough into the flexible conical viewing container.

6. The device of claim 5 further comprising a conical insert, having an insert interior conical reflective surface, which conical insert is adjustable to fit within the reflective conical viewing container so that the apex cap is capable of being formed into a conical shape to match the conical shape of the flexible conical viewing container and the apex cap is capable of being inserted in the flexible conical viewing container to fill the apex opening therein, so that the reflective properties of the interior reflective conical surface of the flexible conical viewing container are changed by the conical insert, which conical insert is further capable of being suspended in the reflective conical viewing container for viewing the reflections of the apex cap therein.

7. The device of claim 1 wherein the means for suspending the at least one object comprises a rod having a handle end and a holding end, the rod having a flexible suspending means attached to the holding end of the rod, the flexible suspending means comprising a tube, the rod being capable of being inserted within the tube with a sliding friction and the object securing means comprises a cord-like element capable of being secured adjustably between the rod and the tube by a friction fit, the cord-like element supporting an object supporting means at a distal end of the cord-like element, the rod and tube being capable of suspending the at least one object within the near focal field, the rod and tube being capable of moving in a variety of types of motion relative to the reflective curved viewing container, thereby bouncing and twirling and spinning and inserting into the container and extracting out of the container the at least one object attachable thereto.

8. The device of claim 1 further comprising a container insert comprising a third sheet of flexible material having at least one reflective surface and having at least one slit cut therein, creating a series of reflective surfaces therein, so that when the third sheet of flexible material is positioned in the reflective curved viewing container the third sheet of flexible material conforms to the shape of the reflective curved viewing container and the third sheet of flexible material forms the interior curved reflective surface thereby capable of kaleidoscopic reflections, wherein the third sheet of flexible material is further capable of being used as an object to be viewed suspended in the near focal field.

9. The device of claim 1 wherein the reflective curved viewing container is formed of a water resistant material and the reflective curved viewing container is holding a liquid therein, and the liquid contained therein comprises the means for suspending the at least one object and the means for creating a variety of types of relative motion between the at least one object and the reflective curved viewing container.

10. The device of claim 1 further comprising a support means for the reflective curved viewing container comprising a strip of bendable material having two ends, the strip formed into a curved support with the ends connected by an adjustable connecting means, so that the support means forms a tubular support stand having a central opening therein to receive the reflective curving viewing container resting in the central opening, the support stand being adjustable and capable of supporting variously sized reflective curved viewing containers.

11. The device of claim 1 further comprising a support means for the reflective curved viewing container comprising a base capable of resting on a horizontal surface and at least two non-slip support elements extending vertically from the base, the curved viewing container capable of fitting between and being supported by the support elements, the base having a means to support the means for suspending the at least one object.

12. The device of claim 1 further comprising a support means for the reflective curved viewing container comprising a base capable of resting on a horizontal surface and an object suspending means comprising an angled rod capable of being movably attached to the base, the base capable of receiving the reflective curved viewing container resting thereon, the curved reflective viewing container further comprising a means for attaching the curved reflective viewing container to the angled rod, the base having a first planar surface pivotally attached thereto by a hinging means, a second planar surface pivotally attached to the first planar surface by a hinging means, the second planar surface having an opening therein adjacent to the first planar surface, a bottom edge adjacent to the base, and a tab protruding from the bottom edge, and the angled rod comprises a proximal end movably insertable in the opening in the second planar surface and a distal end with a cord-like element attached thereto, the cord-like element having an object suspending means, so that with the angled rod positioned in the opening and the curved reflective viewing container attached to the rod, the object suspending means is capable of suspending the object movably within the near focal field of the reflective curved viewing container, and moving the tab alters the angle of the angled rod repositioning the object and the curved reflective viewing container.

13. The device of claim 1 further comprising a support means for the reflective curved viewing container comprising a frame having at least one suspending means attached thereto, the at least one suspending means capable of supporting the reflective curved viewing container attached to the at least one suspending means and suspended from the frame by the at least one suspending means, the frame having a means to support the means for suspending the at least one object.

14. The device of claim 1 further comprising a support means for the reflective curved viewing container comprising a first suspending means suspended from an exterior object above the reflective curved viewing container, the first suspending means attached to the exterior of the viewing container, so that the reflective curved viewing container faces downwardly and is capable of being viewed from below, and the means for suspending the object comprises a second suspending means from the interior of the curved container extending down into the reflective curved viewing container.

15. The device of claim 1 further comprising a transparent cover over the viewing opening, the transparent cover capable of holding the object suspending means.

16. The device of claim 1 wherein the curved structure comprises a flexible material which is collapsible into a flat configuration and further comprising a foldable structure having two elements connected together by a hinge means, each of the two elements having a flat interior face capable of folding flat together, and having the curved structure attached to the flat interior face of each of the two elements, so that a closing of the two elements by folding the two elements together sandwiches the curved structure flat between the two elements and an opening of the two elements by pivoting the two elements apart opens the curved structure adjustably to any desired opening size and the opening and closing causes relative motion and apparent relative motion between the at least one object and the interior curved reflective surface; the means for suspending the at least one object comprising an elastic cord element attached across the viewing opening, the elastic cord element having the at least one object attached thereto so that the at least one object is capable of being turned to wind up the elastic cord element prior to the closing so that the opening produces a spinning of the at least one object.

17. The device of claim 16 wherein the two elements are provided with a slit cut into each of the two elements through the hinge means at an angle to the hinge means thereby forming a triangular tab which is capable of being inserted inwardly between the two elements so that the two elements are held apart in an open position by the triangular tab.

18. The device of claim 1 wherein the curved structure comprises a segment of a sphere having an annular ring around a perimeter of the viewing opening, the annular ring being sufficiently wide to cover any ring-type distortions on the curved reflective surface adjacent to the viewing opening so that the reflective image is capable of filling the entire portion of the curved reflective surface visible inside the annular ring.

19. The device of claim 1 wherein the curved structure comprises a segment of a sphere having a depth from the viewing opening to a deepest point on the reflective surface visible on the concave surface less than one fifth of the diameter of the sphere so that there are no distracting rim ring reflections.

20. The device of claim 1 further comprising a support frame formed of a strip of bendable material formed into a ring with overlapping ends interconnected, the reflective curved viewing container being positioned within the ring and suspended therefrom in a central position by at least one transparent cord-like element, so that the ring frames the reflective curved viewing container, and further comprising an adjustable holding rod formed of a stiff material movably attached in a horizontal orientation to a top of the ring by a holding means which allows sliding of the adjustable holding rod with a working end of the adjustable holding rod protruding beyond the ring, the holding rod having a piece of sculpture suspended therefrom by a transparent cord-like element, so that the adjustable holding rod is capable of moving the sculpture toward or away from the curved reflective surface of the reflective curved viewing container within the near focal field to alter the reflections and the sculpture is capable of swinging and spinning on the transparent cord-like element to produce moving reflections, the sculpture and the reflections being visible simultaneously in front of the viewing opening.

* * * * *